(12) United States Patent
Glew et al.

(10) Patent No.: US 9,443,085 B2
(45) Date of Patent: Sep. 13, 2016

(54) INTRUSION DETECTION USING TAINT ACCUMULATION

(75) Inventors: Andrew F. Glew, Hillsboro, OR (US); Daniel A. Gerrity, Seattle, WA (US); Clarence T. Tegreene, Bellevue, WA (US)

(73) Assignee: Elwha LLC, Bellevue, WA (US)

(*) Notice: Subject to any disclaimer, the term of this patent is extended or adjusted under 35 U.S.C. 154(b) by 144 days.

(21) Appl. No.: 13/199,368

(22) Filed: Aug. 26, 2011
(Under 37 CFR 1.47)

(65) Prior Publication Data

US 2013/0024937 A1 Jan. 24, 2013

Related U.S. Application Data

(63) Continuation-in-part of application No. 13/136,024, filed on Jul. 19, 2011, and a continuation-in-part of application No. 13/136,401, filed on Jul. 29, 2011, and a continuation-in-part of application No. 13/136,400, filed on Jul. 29, 2011, and a continuation-in-part of application No. 13/136,666, filed on Aug. 4, 2011, and a continuation-in-part of application No. 13/136,670, filed on Aug. 4, 2011.

(51) Int. Cl.
| | | |
|---|---|---|
| *G06F 21/00* | (2013.01) | |
| *H04L 12/00* | (2006.01) | |
| *G06F 21/57* | (2013.01) | |
| *H04L 29/06* | (2006.01) | |

(52) U.S. Cl.
CPC ............. *G06F 21/577* (2013.01); *H04L 63/14* (2013.01)

(58) Field of Classification Search
CPC ........................................................ H04L 63/14
USPC ........................................................ 726/22–25
See application file for complete search history.

(56) References Cited

U.S. PATENT DOCUMENTS

| | | |
|---|---|---|
| 4,087,856 A | 5/1978 | Attanasio |
| 4,525,599 A | 6/1985 | Curran et al. |
| 5,437,032 A | 7/1995 | Wolf et al. |
| 5,623,637 A | 4/1997 | Jones et al. |
| 6,006,328 A | 12/1999 | Drake |
| 6,057,598 A | 5/2000 | Payne et al. |
| 6,145,064 A | 11/2000 | Long et al. |
| 6,154,741 A | 11/2000 | Feldman |

(Continued)

FOREIGN PATENT DOCUMENTS

WO    WO 01/99075 A2    12/2001

OTHER PUBLICATIONS

Stone, Harold S.; "A Logic-in-Memory Computer"; IEEE Transactions on Computers; bearing a date of Jan. 1970; pp. 73-78.

(Continued)

*Primary Examiner* — Alexander Lagor

(57) ABSTRACT

A method operable in a computing device adapted for handling security risk can use taint accumulation to detect intrusion. The method can comprise receiving a plurality of taint indicators indicative of potential security risk from a plurality of distinct sources at distinct times, and accumulating the plurality of taint indicators independently using a corresponding plurality of distinct accumulation functions. Security risk can be assessed according to a risk assessment function that is cumulative of the plurality of taint indicators.

42 Claims, 20 Drawing Sheets

(56) References Cited

U.S. PATENT DOCUMENTS

| | | |
|---|---|---|
| 6,199,055 B1 | 3/2001 | Kara et al. |
| 6,205,544 B1 | 3/2001 | Mills et al. |
| 6,584,488 B1 | 6/2003 | Brenner et al. |
| 6,654,745 B2 | 11/2003 | Feldman |
| 6,996,547 B1 | 2/2006 | Tugenberg et al. |
| 7,035,277 B1 | 4/2006 | Batcher |
| 7,054,190 B2 | 5/2006 | Hanyu et al. |
| 7,069,447 B1 | 6/2006 | Corder |
| 7,093,250 B1 | 8/2006 | Rector |
| 7,107,176 B2 | 9/2006 | Henry et al. |
| 7,124,170 B1 | 10/2006 | Sibert |
| 7,165,150 B2 | 1/2007 | Alverson et al. |
| 7,191,185 B2 | 3/2007 | Dweck et al. |
| 7,221,600 B2 | 5/2007 | Hara et al. |
| 7,284,000 B2 | 10/2007 | Kuehr-McLaren et al. |
| 7,379,999 B1 | 5/2008 | Zhou et al. |
| 7,395,414 B2 | 7/2008 | Le et al. |
| 7,502,946 B2 | 3/2009 | Perkins et al. |
| 7,533,242 B1 | 5/2009 | Moll et al. |
| 7,533,273 B2 | 5/2009 | Patariu et al. |
| 7,549,054 B2 | 6/2009 | Brodie et al. |
| 7,594,111 B2 | 9/2009 | Kiriansky et al. |
| 7,620,941 B1 | 11/2009 | Leventhal |
| 7,644,162 B1 | 1/2010 | Zhu et al. |
| 7,676,578 B1 | 3/2010 | Zhu et al. |
| 7,708,195 B2 | 5/2010 | Yoshida et al. |
| 7,757,282 B2 | 7/2010 | Pandit et al. |
| 7,844,733 B2 | 11/2010 | Betts et al. |
| 7,861,305 B2 | 12/2010 | McIntosh et al. |
| 7,870,610 B1 | 1/2011 | Mitchell et al. |
| 7,873,998 B1 | 1/2011 | Wilkinson et al. |
| 7,877,585 B1 | 1/2011 | Coon et al. |
| 7,953,986 B2 | 5/2011 | Lee |
| 7,958,370 B2 | 6/2011 | Hirai et al. |
| 7,958,558 B1 | 6/2011 | Leake et al. |
| 8,022,724 B1 | 9/2011 | Jenkins, IV |
| 8,099,574 B2 | 1/2012 | Savagaonkar et al. |
| 8,136,158 B1 | 3/2012 | Sehr et al. |
| 8,146,106 B2 | 3/2012 | Kim et al. |
| 8,281,388 B1 | 10/2012 | Sobel et al. |
| 8,286,250 B1 | 10/2012 | Le et al. |
| 8,312,509 B2 | 11/2012 | Zimmer et al. |
| 8,381,192 B1 | 2/2013 | Drewry et al. |
| 8,397,238 B2 | 3/2013 | Venkumahanti et al. |
| 8,473,754 B2 | 6/2013 | Jones et al. |
| 8,510,827 B1 | 8/2013 | Leake et al. |
| 8,516,583 B2 | 8/2013 | Thomas et al. |
| 8,555,390 B2 | 10/2013 | Thiebeauld de la Crouee et al. |
| 8,621,144 B2 | 12/2013 | Eschmann et al. |
| 8,675,868 B1 | 3/2014 | Yearsley et al. |
| 8,683,581 B2 | 3/2014 | Lefloch |
| 8,688,583 B2 | 4/2014 | Boccon-Gibod et al. |
| 8,694,947 B1 | 4/2014 | Venkataramani et al. |
| 8,732,431 B2 | 5/2014 | Culley et al. |
| 2002/0040420 A1 | 4/2002 | Yamauchi et al. |
| 2002/0075844 A1 | 6/2002 | Hagen |
| 2002/0141577 A1 | 10/2002 | Ripley et al. |
| 2002/0142833 A1 | 10/2002 | Tsuchida et al. |
| 2002/0152212 A1 | 10/2002 | Feldman |
| 2002/0156939 A1 | 10/2002 | Armstrong et al. |
| 2002/0166058 A1 | 11/2002 | Fueki |
| 2003/0046238 A1 | 3/2003 | Nonaka et al. |
| 2003/0084308 A1 | 5/2003 | Van Rijnswou |
| 2003/0088759 A1 | 5/2003 | Wilkerson |
| 2003/0149869 A1 | 8/2003 | Gleichauf |
| 2003/0159070 A1 | 8/2003 | Mayer et al. |
| 2003/0182436 A1 | 9/2003 | Henry |
| 2003/0187974 A1 | 10/2003 | Burbeck et al. |
| 2003/0188132 A1 | 10/2003 | Keltcher et al. |
| 2004/0054925 A1* | 3/2004 | Etheridge et al. ............ 713/201 |
| 2004/0088691 A1 | 5/2004 | Hammes et al. |
| 2004/0116183 A1 | 6/2004 | Prindle |
| 2004/0117639 A1 | 6/2004 | Mowery |
| 2004/0117790 A1 | 6/2004 | Rhine |
| 2004/0153318 A1 | 8/2004 | Chamberlain |
| 2004/0199763 A1 | 10/2004 | Freund |
| 2004/0236958 A1 | 11/2004 | Teicher et al. |
| 2005/0004924 A1 | 1/2005 | Baldwin |
| 2005/0060710 A1 | 3/2005 | Kush |
| 2005/0081207 A1 | 4/2005 | Hoflehner et al. |
| 2005/0125613 A1 | 6/2005 | Kim et al. |
| 2005/0125793 A1 | 6/2005 | Aguilar et al. |
| 2005/0138074 A1 | 6/2005 | O'Connor et al. |
| 2005/0160428 A1 | 7/2005 | Ayachitula et al. |
| 2005/0171903 A1 | 8/2005 | Yacobi et al. |
| 2005/0177596 A1 | 8/2005 | Wu et al. |
| 2005/0195975 A1 | 9/2005 | Kawakita |
| 2005/0213751 A1 | 9/2005 | Apostolopoulos et al. |
| 2005/0232415 A1 | 10/2005 | Little et al. |
| 2005/0268075 A1 | 12/2005 | Caprioli et al. |
| 2006/0005082 A1 | 1/2006 | Fossum et al. |
| 2006/0021054 A1 | 1/2006 | Costa et al. |
| 2006/0025952 A1 | 2/2006 | Buhr |
| 2006/0161715 A1 | 7/2006 | Hamaguchi |
| 2006/0161978 A1 | 7/2006 | Abadi et al. |
| 2006/0184767 A1 | 8/2006 | Le et al. |
| 2006/0289659 A1 | 12/2006 | Mizushima |
| 2007/0022287 A1 | 1/2007 | Beck et al. |
| 2007/0050477 A1 | 3/2007 | Isaacs |
| 2007/0079304 A1 | 4/2007 | Zheng et al. |
| 2007/0101433 A1 | 5/2007 | Louch et al. |
| 2007/0240215 A1 | 10/2007 | Flores et al. |
| 2007/0250837 A1 | 10/2007 | Herington et al. |
| 2008/0005586 A1 | 1/2008 | Munguia |
| 2008/0028467 A1 | 1/2008 | Kommareddy et al. |
| 2008/0046997 A1 | 2/2008 | Wang |
| 2008/0052539 A1 | 2/2008 | MacMillan et al. |
| 2008/0052541 A1 | 2/2008 | Ginter et al. |
| 2008/0072075 A1 | 3/2008 | Kohiyama et al. |
| 2008/0104004 A1 | 5/2008 | Brave et al. |
| 2008/0114990 A1 | 5/2008 | Hilbert et al. |
| 2008/0127335 A1 | 5/2008 | Khan et al. |
| 2008/0168279 A1 | 7/2008 | Kanai |
| 2008/0184016 A1 | 7/2008 | Erlingsson et al. |
| 2008/0222397 A1 | 9/2008 | Wilkerson et al. |
| 2008/0222532 A1 | 9/2008 | Mester et al. |
| 2008/0250216 A1 | 10/2008 | Kershaw et al. |
| 2008/0256346 A1 | 10/2008 | Lee et al. |
| 2008/0263663 A1 | 10/2008 | Ide et al. |
| 2008/0276317 A1* | 11/2008 | Chandola et al. ............ 726/23 |
| 2008/0279371 A1 | 11/2008 | Lee et al. |
| 2008/0288785 A1 | 11/2008 | Rao et al. |
| 2008/0301467 A1 | 12/2008 | Saito |
| 2008/0313482 A1 | 12/2008 | Karlapalem et al. |
| 2008/0320565 A1 | 12/2008 | Buch et al. |
| 2009/0006755 A1 | 1/2009 | Illikkal et al. |
| 2009/0007125 A1 | 1/2009 | Barsness et al. |
| 2009/0028135 A1 | 1/2009 | Mantripragada et al. |
| 2009/0038014 A1 | 2/2009 | Force et al. |
| 2009/0063824 A1 | 3/2009 | Leaback et al. |
| 2009/0070338 A1 | 3/2009 | Spitzig et al. |
| 2009/0083520 A1 | 3/2009 | Kanemura |
| 2009/0106563 A1 | 4/2009 | Cherpantier |
| 2009/0144557 A1 | 6/2009 | Sutton |
| 2009/0172056 A1 | 7/2009 | Pradhan et al. |
| 2009/0172686 A1 | 7/2009 | Chen et al. |
| 2009/0183263 A1 | 7/2009 | McMichael et al. |
| 2009/0187743 A1 | 7/2009 | Greenhalgh |
| 2009/0187771 A1 | 7/2009 | McLellan, Jr. |
| 2009/0210881 A1 | 8/2009 | Duller |
| 2009/0222910 A1 | 9/2009 | Le Bihan et al. |
| 2009/0265712 A1 | 10/2009 | Herington |
| 2009/0282474 A1 | 11/2009 | Chen et al. |
| 2009/0288090 A1 | 11/2009 | Ujibashi et al. |
| 2009/0320129 A1 | 12/2009 | Pan et al. |
| 2009/0320136 A1 | 12/2009 | Lambert et al. |
| 2009/0327718 A1 | 12/2009 | Hirai |
| 2010/0017638 A1 | 1/2010 | Ghose |
| 2010/0042824 A1 | 2/2010 | Lee et al. |
| 2010/0131957 A1 | 5/2010 | Kami |
| 2010/0165991 A1 | 7/2010 | Veal et al. |
| 2010/0191349 A1 | 7/2010 | Munaga |
| 2010/0269168 A1 | 10/2010 | Hegli et al. |
| 2010/0281273 A1 | 11/2010 | Lee et al. |

(56) References Cited

U.S. PATENT DOCUMENTS

| | | |
|---|---|---|
| 2010/0299305 A1 | 11/2010 | Laxman et al. |
| 2010/0318998 A1 | 12/2010 | Golla |
| 2011/0029140 A1 | 2/2011 | Jordan et al. |
| 2011/0066896 A1 | 3/2011 | Ebina et al. |
| 2011/0072292 A1 | 3/2011 | Khawand et al. |
| 2011/0129024 A1 | 6/2011 | Karthik et al. |
| 2011/0131402 A1 | 6/2011 | Mittal |
| 2011/0131550 A1 | 6/2011 | Burckhardt et al. |
| 2011/0131658 A1 | 6/2011 | Bahl |
| 2011/0138124 A1 | 6/2011 | Hill et al. |
| 2011/0138473 A1 | 6/2011 | Yee et al. |
| 2011/0179176 A1 | 7/2011 | Ravichandran et al. |
| 2011/0202927 A1 | 8/2011 | Miloushev et al. |
| 2011/0289586 A1 | 11/2011 | Kc et al. |
| 2011/0296440 A1 | 12/2011 | Laurich et al. |
| 2011/0307382 A1 | 12/2011 | Siegel et al. |
| 2011/0314254 A1 | 12/2011 | Smriti et al. |
| 2011/0320788 A1 | 12/2011 | Assarpour |
| 2011/0320793 A1 | 12/2011 | Bell, Jr. et al. |
| 2012/0079492 A1 | 3/2012 | Chambliss et al. |
| 2012/0102489 A1 | 4/2012 | Staiman et al. |
| 2012/0110292 A1 | 5/2012 | Martini |
| 2012/0159183 A1 | 6/2012 | Adams et al. |
| 2012/0179952 A1 | 7/2012 | Tuyls et al. |
| 2012/0185863 A1 | 7/2012 | Krstic et al. |
| 2012/0210325 A1 | 8/2012 | de Lind van Wijngaarden et al. |
| 2012/0221591 A1 | 8/2012 | Yerneni et al. |
| 2012/0233698 A1* | 9/2012 | Watters et al. ............ 726/25 |
| 2012/0255018 A1 | 10/2012 | Sallam |
| 2012/0255021 A1 | 10/2012 | Sallam |
| 2012/0265975 A1 | 10/2012 | Kimelman |
| 2012/0266243 A1 | 10/2012 | Turkulainen |
| 2012/0278903 A1 | 11/2012 | Pugh |
| 2013/0024867 A1 | 1/2013 | Glew et al. |
| 2013/0081039 A1 | 3/2013 | Glew et al. |
| 2013/0086687 A1 | 4/2013 | Chess et al. |
| 2013/0111489 A1 | 5/2013 | Glew et al. |
| 2013/0111491 A1 | 5/2013 | Glew et al. |
| 2013/0246605 A1 | 9/2013 | Mahadik et al. |
| 2013/0305243 A1 | 11/2013 | Hiki |
| 2014/0245449 A1 | 8/2014 | Powell et al. |

OTHER PUBLICATIONS

Bird et al.; "Lighthouse: Hardware Support for Enforcing Information Flow Control on ManyCore Systems"; bearing a date of 2008 (as provided by examiner); 10 pages.

Clause et al.; "Dytan: A Generic Dynamic Taint Analysis Framework"; ISSTA '07; bearing a date of Jul. 9-12, 2007; pp. 196-206; ACM.

Ho et al.; "Practical Taint-Based Protection using Demand Emulation"; EuroSys '06; bearing a date of Apr. 18-21, 2006; 13 pages; ACM.

Newsome et al.; "Dynamic Taint Analysis for Automation Detection, Analysis, and Signature Generation of Exploits on Commodity Software"; Carnegie Mellon University Research Showcase; bearing a date of Jan. 1, 2005; 18 pages.

Schwartz et al.; "All You Ever Wanted to Know About Dynamic Taint Analysis and Forward Symbolic Execution (but might have been afraid to ask)"; 2010 IEEE Symposium on Security and Privacy; bearing a date of 2010; pp. 317-331; IEEE.

Song et al.; "BitBlaze: A New Approach to Computer Security via Binary Analysis"; ICISS 2008; bearing a date of 2008; pp. 1-25; Springer-Verlag Berlin Heidelberg.

Yin et al.; "Panorama: Capturing System-wide Information Flow for Malware Detection and Analysis"; CCS '07; bearing a date of Oct. 29-Nov. 2, 2007; pp. 116-127; ACM.

Zeldovich et al.; "Hardware Enforcement of Application Security Policies Using Tagged Memory"; bearing a date of 2008 (as provided by examiner), printed Feb. 7, 2013; pp. 1-16; located at: http://static.usenix.org/events/osdi08/tech/full_papers/zeldovich/zeldovich_html/.

Zhang et al.; "Neon: System Support for Derived Data Management"; VEE '10; bearing a date of Mar. 17-19, 2010; 12 pages; ACM.

Adya et al.; "FARSITE: Federated, Available, and Reliable Storage for an Incompletely Trusted Environment"; $5^{th}$ Symposium on Operating Systems Design and Implementation; bearing a date of Dec. 2002; pp. 1-14; Boston, MA.

Kolbitsch et al.; "Extending Mondrian Memory Protection"; Information Systems and Technology Panel (IST) Symposium, Tallinn, Estonia; bearing a date of Nov. 22-23, 2010; pp. 10-1 through 10-18 and 1 Report Documentation Page; NATO-OTAN.

Abadi et al.; "Control-Flow Integrity: Principles, Implementations, and Applications"; bearing a date of Nov. 1, 2004; pp. 1-33.

Kiriansky et al.; "Secure Execution Via Program Shepherding"; Proceedings of the $11^{th}$ USENIX Security Symposium; bearing a date of Aug. 2002, created on Dec. 9, 2013; pp. 1-16; San Francisco, CA.

"Instruction Set"; Wikipedia; bearing a date of May 15, 2010; pp. 1-10; located at: https://en.wikipedia.org/wiki/Instruction_set.

Realtime Privacy Monitoring on Smartphones; located at http://appanalysis.org; (retrieved on Oct. 8, 2015) created on Dec. 2, 2015; pp. 1-2.

Enck et al.; "TaintDroid: An Information-Flow Tracking System for Realtime Privacy Monitoring on Smartphones"; Proceedings of the $9^{th}$ USENIX Symposium on Operating Systems Design and Implementation (OSDI), Oct. 2010. Vancouver, BC.; created on Dec. 2, 2015; pp. 1-15.

Chen et al.; "Log-Based Architectures for General-Purpose Monitoring of Deployed Code"; bearing a date of Oct. 21, 2006; 3 pages; ACM.

Liu et al.; "Adaptive Entitlement Control of Resource Containers on Shared Servers"; bearing a date of 2005; pp. 163-176; IEEE.

Liu et al.; "Optimal Multivariate Control for Differentiated Services on a Shared Hosting Platform"; Proceedings of the $46^{th}$ IEEE Conference on Decision and Control; bearing a date of Dec. 12-14, 2007; pp. 3792-3799; IEEE.

Wang et al; "AppRAISE: Application-Level Performance Management in Virtualized Server Environments"; bearing a date of Dec. 2009; pp. 240-254; vol. 6, No. 4; IEEE.

"Opcode"; Wikipedia; bearing a date of Oct. 26, 2014; pp. 1-2; located at: http://en.wikipedia.org/w/index.php?title=Opcode&oldid=175723708.

\* cited by examiner

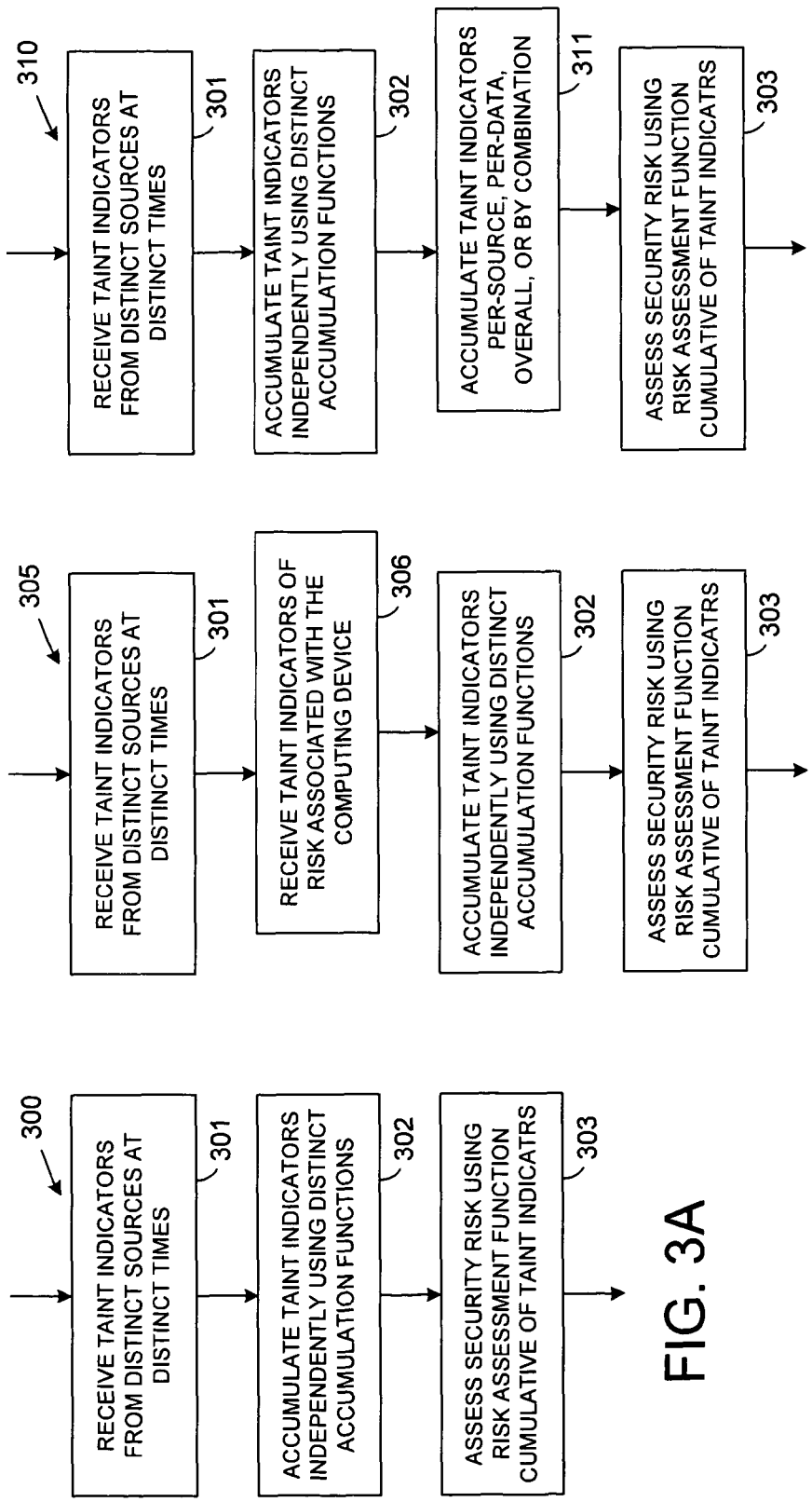

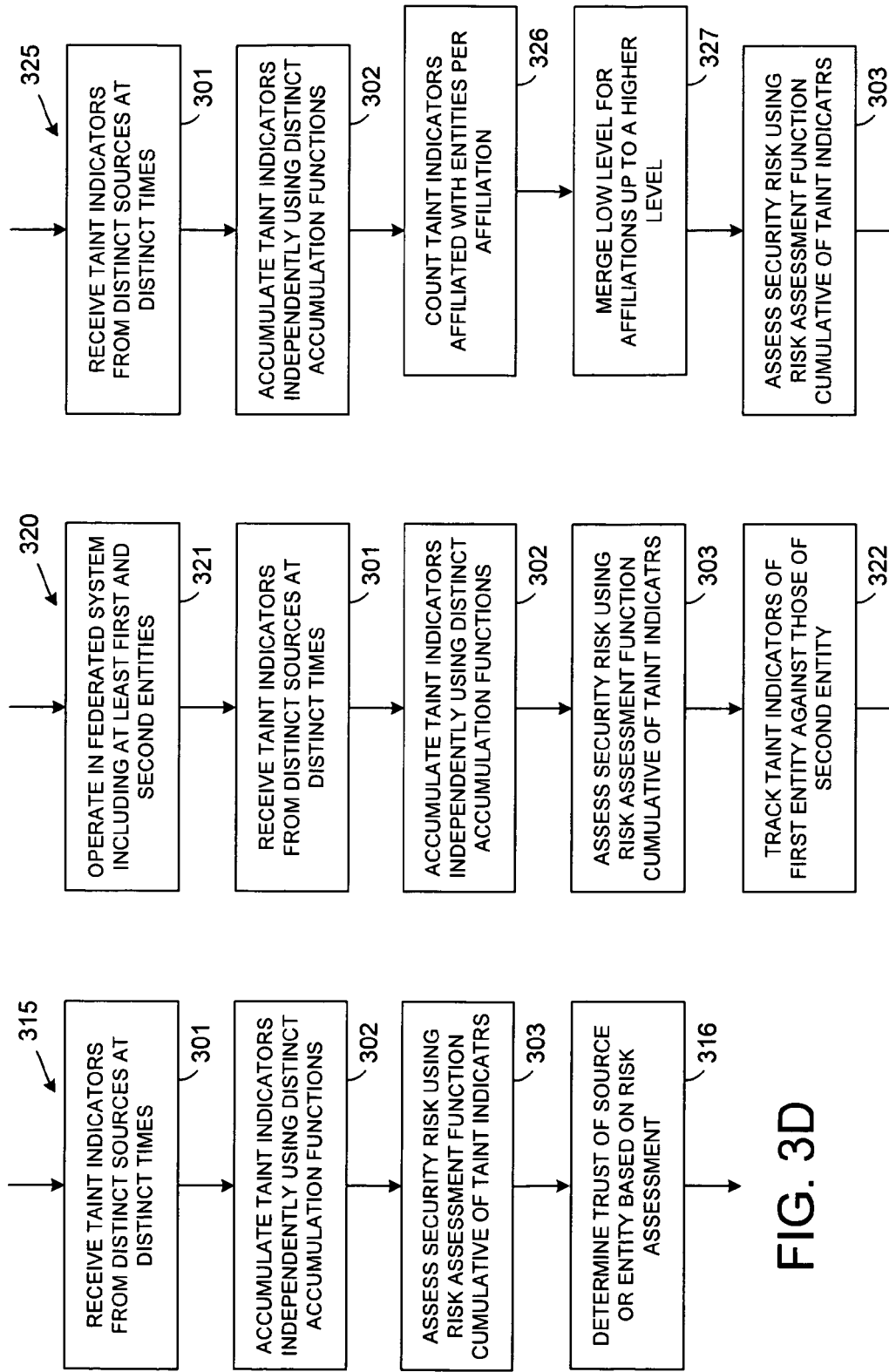

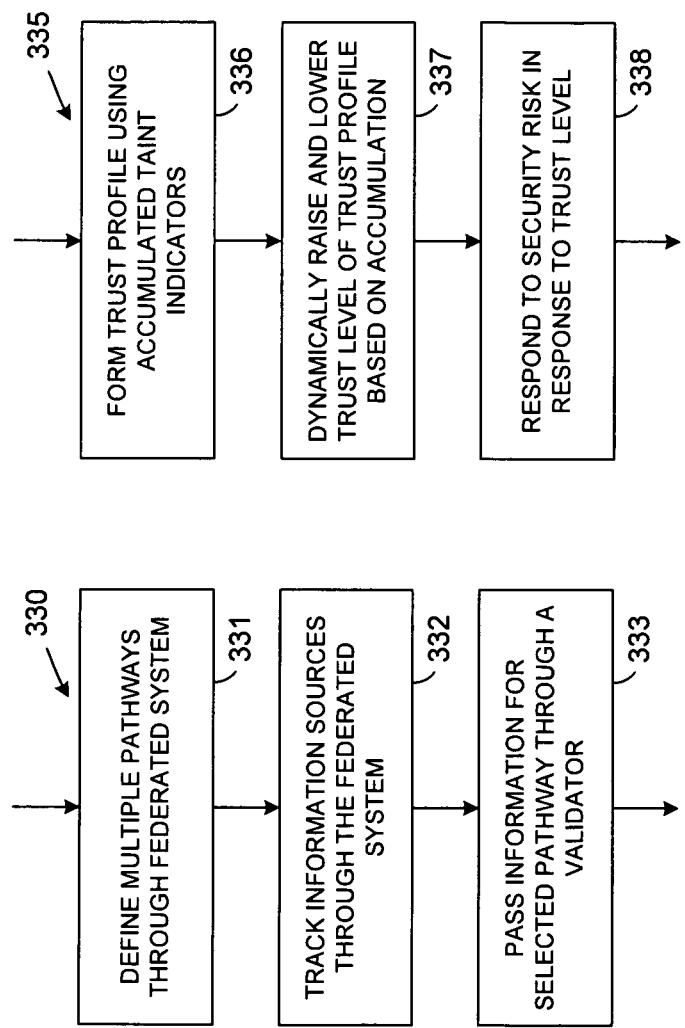

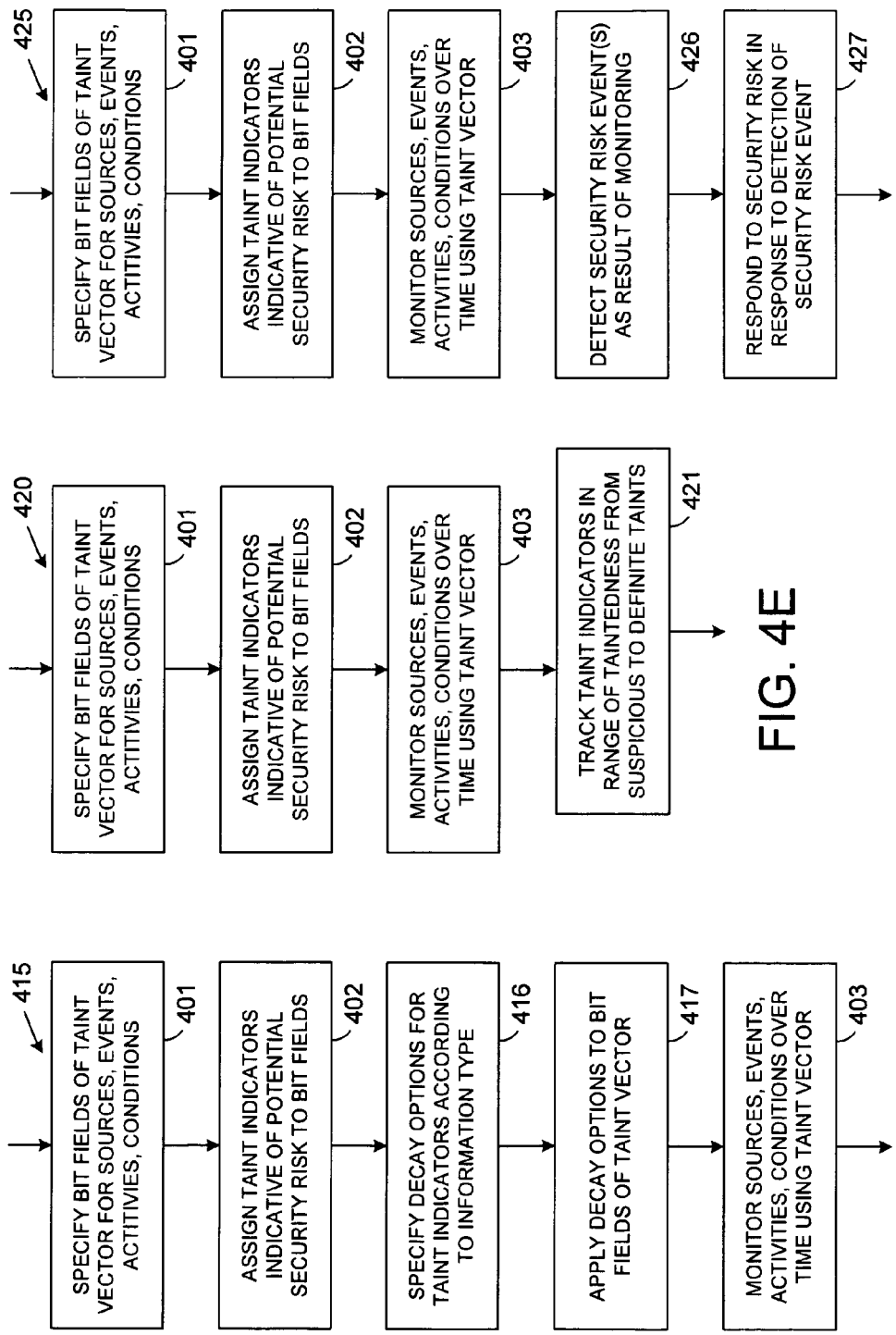

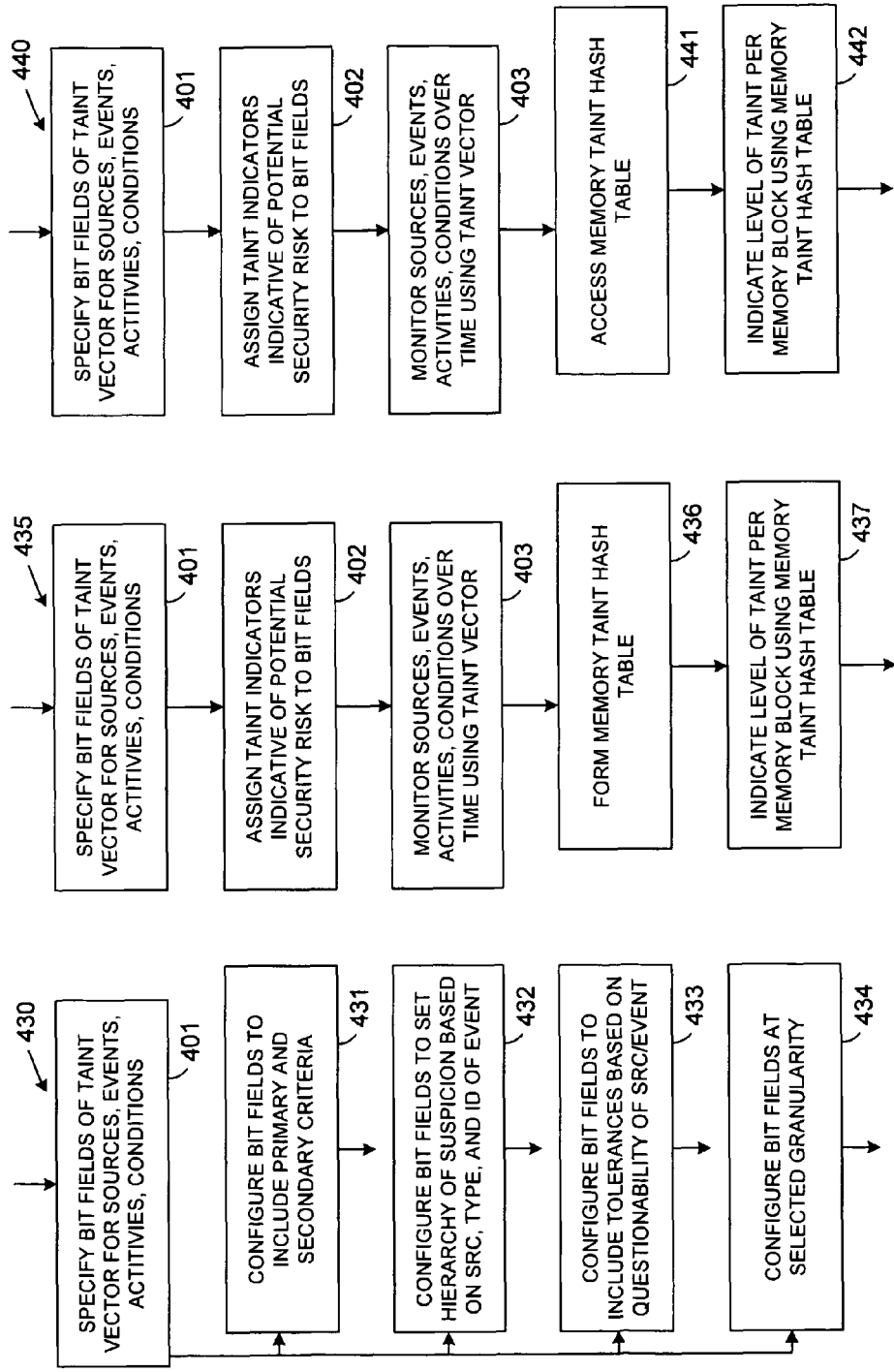

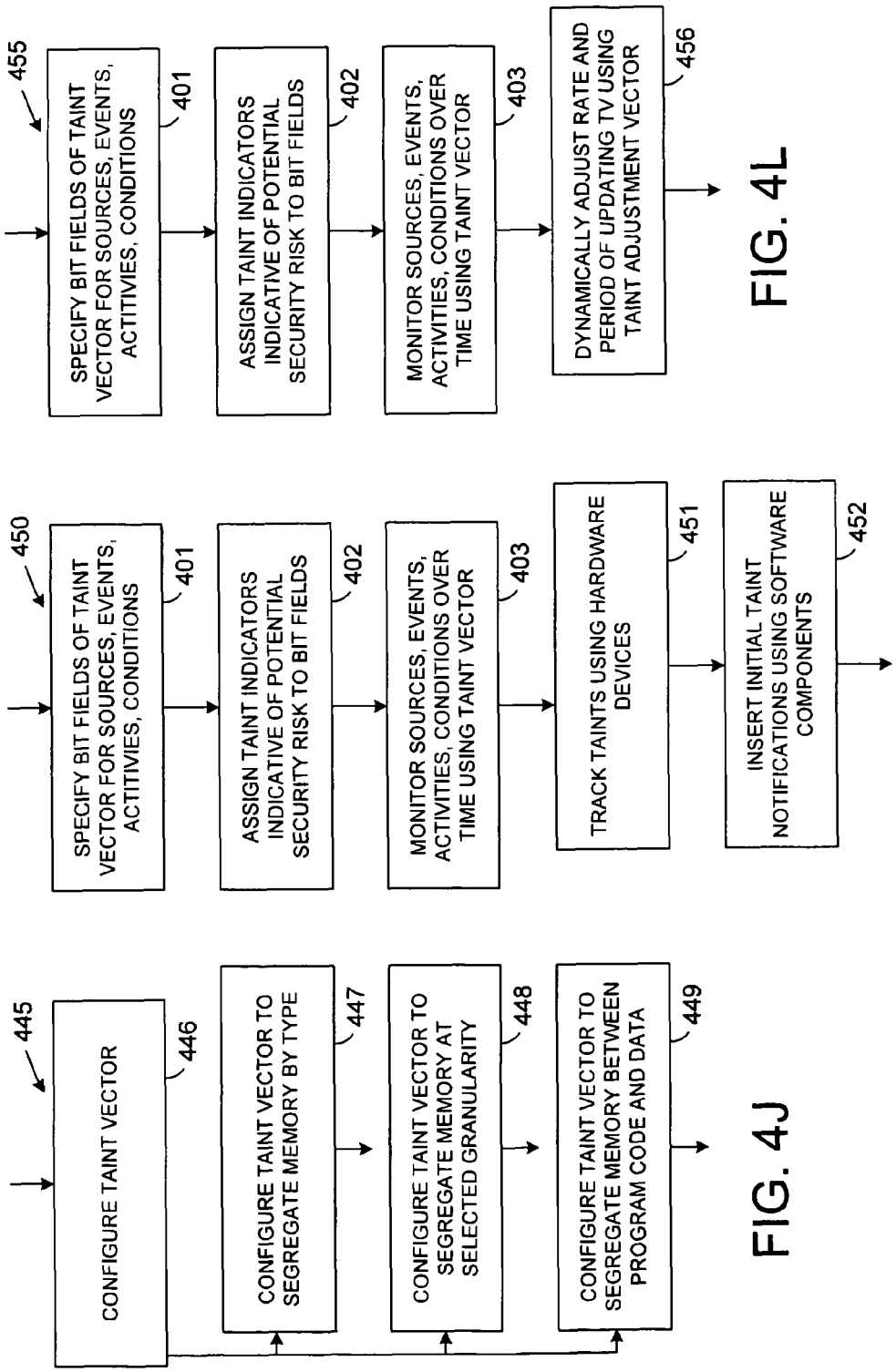

INTRUSION DETECTION USING TAINT ACCUMULATION

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements:

(1) the present application constitutes a continuation-in-part of U.S. patent application Ser. No. 13/136,024, entitled "CONTROL FLOW INTEGRITY", naming Andrew F. Glew, Daniel A. Gerrity, and Clarence T. Tegreene, as inventors, filed Jul. 19, 2011, which is currently co-pending, or is an application of which a currently co-pending application is entitled to the benefit of the filing date;

(2) the present application constitutes a continuation-in-part of U.S. patent application Ser. No. 13/136,401, entitled "FINE-GRAINED SECURITY IN FEDERATED DATA SETS" naming Andrew F. Glew, Daniel A. Gerrity, and Clarence T. Tegreene, as inventors, filed Jul. 29, 2011, which is currently co-pending, or is an application of which a currently co-pending application is entitled to the benefit of the filing date;

(3) the present application constitutes a continuation-in-part of U.S. patent application Ser. No. 13/136,400, entitled "ENCRYPTED MEMORY" naming Andrew F. Glew, Daniel A. Gerrity, and Clarence T. Tegreene, as inventors, filed Jul. 29, 2011, which is currently co-pending, or is an application of which a currently co-pending application is entitled to the benefit of the filing date;

(4) the present application constitutes a continuation-in-part of U.S. patent application Ser. No. 13/136,666, entitled "SECURITY PERIMETER" naming Andrew F. Glew, Daniel A. Gerrity, and Clarence T. Tegreene, as inventors, filed Aug. 4, 2011, which is currently co-pending, or is an application of which a currently co-pending application is entitled to the benefit of the filing date; and (5) the present application constitutes a continuation-in-part of U.S. patent application Ser. No. 13/136,670, entitled "PROCESSOR OPERABLE TO ENSURE CODE INTEGRITY" naming Andrew F. Glew, Daniel A. Gerrity, and Clarence T. Tegreene, as inventors, filed Aug. 4, 2011, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

BACKGROUND

Malicious software, also called malware, refers to programming (code, scripts, active content, and other software) designed to disrupt or deny operation, gather information to violate privacy or exploitation, gain unauthorized access to system resources, and enable other abusive behavior. The expression is a general term used by computer professionals to mean a variety of forms of hostile, intrusive, or annoying software or program code.

Malware includes various software including computer viruses, worms, Trojan horses, spyware, dishonest adware, scareware, crimeware, rootkits, and other malicious and unwanted software or program, and is considered to be malware based on the perceived intent of the creator rather than any particular features. In legal terms, malware is sometimes termed as a "computer contaminant," for example in the legal codes of U.S. states such as California.

SUMMARY

An embodiment or embodiments of a method operable in a computing device adapted for handling security risk can use taint accumulation to detect intrusion. The method can comprise receiving a plurality of taint indicators indicative of potential security risk from a plurality of distinct sources at distinct times, and accumulating the plurality of taint indicators independently using a corresponding plurality of distinct accumulation functions. Security risk can be assessed according to a risk assessment function that is cumulative of the plurality of taint indicators.

BRIEF DESCRIPTION OF THE DRAWINGS

Embodiments of the invention relating to both structure and method of operation may best be understood by referring to the following description and accompanying drawings:

FIGS. 3A through 3H are schematic flow diagrams showing an embodiment or embodiments of a method operable in a computing device adapted for handling security risk which uses taint accumulation to detect intrusion;

DETAILED DESCRIPTION

Figure 1A:
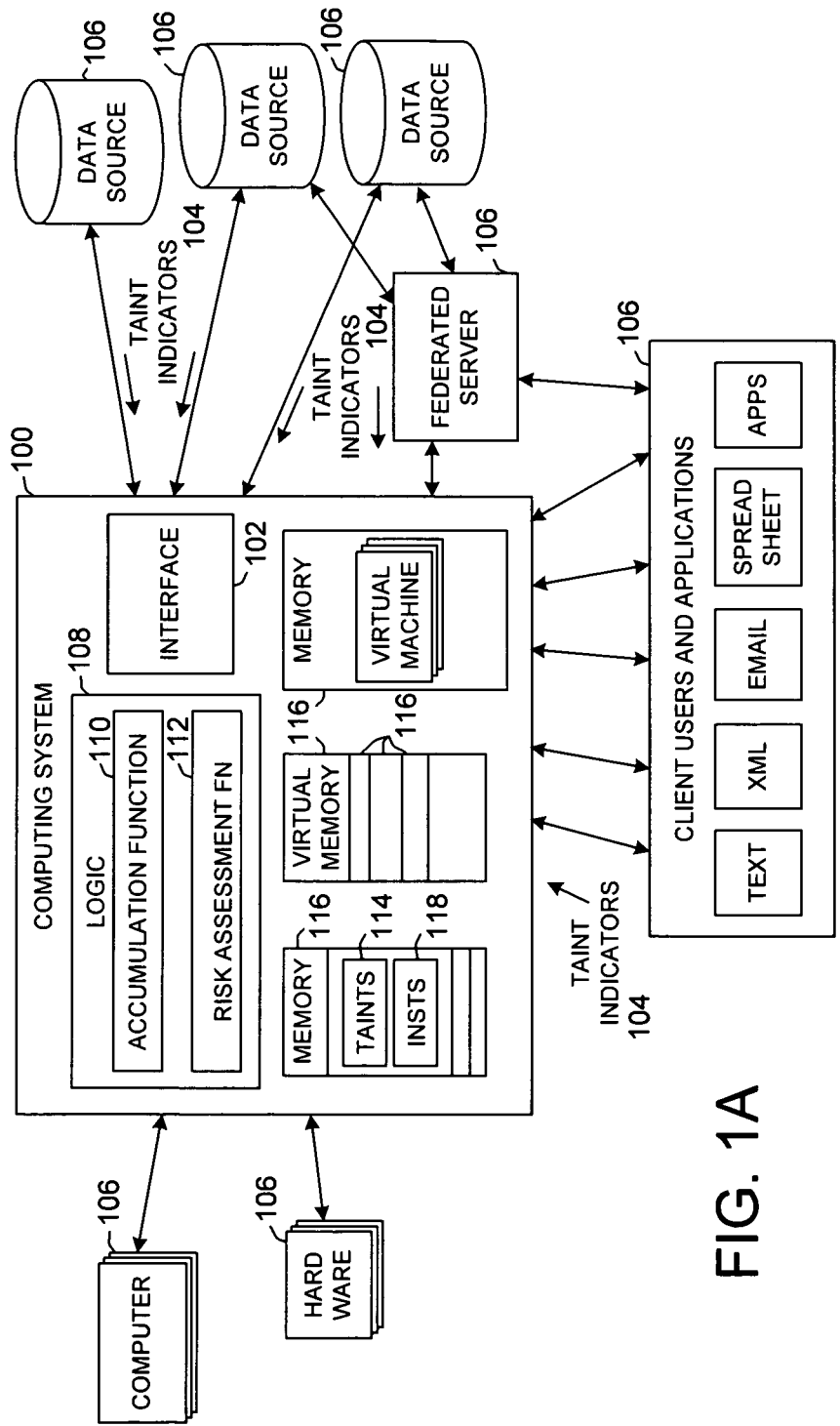
FIGS. 1A, 1B, 1C, 1D, and 1E are respectively, first, second, third, and fourth schematic block diagrams, and a graphical data description depict embodiments of a computing system adapted to manage security risk by accumulating and monitoring taint indications.

In various embodiments, computer systems and associated methods can be configured to include one or more of several improvements that facilitate security. One aspect can be accumulation of taint indicators to distinguish between safe and potentially unsafe data received from safe and potentially unsafe sources. Another aspect is specification and usage of a taint vector to enable monitoring and tracking of a large number of resources and conditions or a wide variety of types without burdening the system and operations with a significant amount of hardware and complexity.

Security in existing networks, systems, and computers is coarse-grained due to large granularity of native code, for example imposed by the 4 kilobyte (kb) size of a virtual memory page. Security is sought in an environment characterized by running of applications that share data with other entities. Security is coarse-grained in that memory blocks can be individually protected. For binary code or machine code, the 4 kb granularity encompasses a large amount of data in comparison to the typical 10 or 12-bit size of machine code words for which individual protection may be sought.

Another security technique can be to assign data to a particular virtual machine, which is even more coarse-grained. For example, if security is sought in the context of a browser not known to be secure, the browser can be assigned a virtual machine that runs only the browser. A virtual machine can encompass more than a CPU alone and include other components and devices such as motherboard I/O devices. The virtual machine thus can be much larger than the 4 kb granularity of memory blocks.

Security can also be sought in software or interpretive environments, for example using Java byte code or C-sharp byte code, which can be more fine-grained but at the cost of much slower performance. An interpreter can support any protection desired, even down to individual bits but is much slower than the machine code level. Performance can be accelerated only by more coarse-grained checking.

What is desired is fine-grained security with suitable speed performance. Fine-grained security is directed toward protecting memory in fine-grained pieces.

Fine-grained security can support resource allocation and resource scheduling, and can be supporting technology for hardware scheduling, virtual memory. Fine-grained security facilitates, for example, for running applications on a computer controlled and owned by another entity.

Various techniques can be used to identify the memory items to be protected including pointers such as a pointer to an object or metadata associated with a pointer, offsets, addresses, and the like.

An example fine-grained security paradigm can use metadata associated with a pointer that identifies a lower bound, and upper bound, and permissions. The pointer can be enabled to point to particular objects or even to any position within an object. Metadata can specify permissions including memory locations to which data can be written, when program code is allowed to execute, how long writing is allowed, and the like. Permissions can be associated with data objects, for example assigning a pointer to an object and, using permissions, allowing only methods belonging to that object to access the object. Another example of permissions can enable access to data, but only for specified purposes, for instance to enable a first running of an object and access allowed to only part of a routine, while preventing access by others. In another example, a particular method can be permitted to run a limited number of times or just one time, and can prevent subsequent access to data when the data has been previously exposed to an authorized reader.

Permissions can implement a concept of poisoning. For example, a user can enter a name into a text field and mark a poisoned bit that prevents subsequent branching or subroutine return. The poisoned bit can function as a dirty bit which indicates whether an item such as an object, memory, or other resource is dirty, which prevents predetermined purposes or actions to the item, for example preventing actions applied to a data block or object, such as not allowing return.

An illustrative computer system can be configured for fine-grained security as supporting infrastructure in a concept of federated sharing and federated data sets. Sensor fusion involves fusing of data and data sets in numerical aspects and permissions aspects, wherein data and data sets are fused in conditions of a first entity owning or controlling a first sensor and a second entity a second sensor.

Fine-grained security can be implemented in an infrastructure can be implemented in an architecture including servers and clients. For example, gaming code servers and gaming console clients can interact by running program code that executes in part on machines controlled by the server and in part on machines controlled by the client. Fine-grained security enables the interaction to be mutually trusted by both sides.

Fine-grained security can be configured to exploit existing infrastructure aspects such as the Trusted Platform Module (TPM) which is installed in computer systems somewhat universally but little used in practice. TPM generally includes secure storage for keys little or no security logic.

In some embodiments, a servers and clients architecture can implement fine-grained security using one or more server downloaded modules. For example, a gaming code server can transfer a server downloaded module that executes on a client wherein the client's user software and operating system is not able to read associated TPM keys. Fine-grained security can be configured to prevent the client or user operating system from reading the TPM keys, for example to ensure isolation in software, and further configured to prevent physical attacks for example via a device such as a logic analyzer on the bus reading sensitive information.

Some system embodiments which support fine-grained security can be activated at boot-strap loading of a computer, for example via microcode executing in the processor. A further aspect of fine-grained security can include physical security of the TPM, for example through use of tamper-evident/resistant packaging. At boot-strap loading, TPM can perform various security operations such as inspecting software version and possibly microcode, ensuring viability of software, for example by creating and applying a hash to each level of code (microcode, firmware, software, and the like), checking against previously run code, signing-off on viability if warranted, and printing a signature of executing code to enable determination of trust.

Fine-grained security operations can further include building or creating a chain of trust, checking each part of operation beginning with TPM, then checking security during operating system functions, downloading of modules, and execution of procedures. In an example configuration, fine-grained security can perform checks of operation system functions which, to the first order, control all operations.

An example of chain of trust can begin with trust of an operating system (for example by an association such as Motion Picture Association of America (MPAA), International Game Developers Association (IGDA), and the like). If the operating system is certified and fine-grained security operable under the certified operating system ensures that the system is not hacked, the chain of trust is established since the operating system prevents user code from accessing downloadable code.

Weaknesses of the chain of trust can be that the process is too linear and easy to break since a single-point of failure breaks trust. Chain of trust also has problems ensuring privacy.

An extension that can improve chain of trust is a late-secure boot which is run later than a typical bootstrap load and can involve security checking in an operating system that is not yet trusted. At running of the late-secure boot, a security initialization is run which starts security process booting in a system that is already running.

A more secure concept of security can be a web of trust. The web of trust can have multiple trust levels which hand trust to the operating system. At each trust level, software can validate code in a stack of code to establish trust. In the web of trust, a failure at some point can be rechecked according to a byzantine path which forms a set of protocols to establish trust. The operating system can use pathfinding or agglomerated trust protocols to analyze trust at each level to enable multiple levels or types of trust validation.

Intrusion detection can be an aspect of fine-grained security.

Intrusion detection can use the concept of poisoning to implement fine-grained security. Poisoning can be used for protection, for example in the case of sensor data or a sensor controlled by an untrusted entity. One or more bits can be allocated to identify aspects of the target sensor and data. Poisoning can be data-defined or entity-defined.

A system can enforce security via accumulation which can be used to quantify poisoning, for example by accumulating multiple indicators of lack of safety or "dirtiness." Accumulation can be operable to accumulate on a per-location basis, per-data basis, overall, or any selected combination. Accumulation can be used to quantify whether data from a particular source or entity can be trusted, rather than to detect security attacks per se.

A taint technique can be used to distinguish between safe and potentially unsafe data received from safe and potentially unsafe sources. The term "taint" can be defined as potentially unsafe data or data received from a potentially unsafe source. Unsafe data and/or sources are untrusted as potentially dangerous, malicious, or suspect according to a predetermined security policy. Security criteria of tainting can be specified independently for various applications, conditions, and/or implementations ranging, for example, from a source, data, and/or resources via which the data is transmitted that are not known to be completely trusted to those known to have positive confirmation of ill-intent, malice, or compromised security attributes. In some implementations, analysis of the data itself may contribute to taint characterization.

Accumulation enables analysis of a particular sensor which is not untrusted as fundamentally faulty or inherently dishonest but rather imperfect to some degree, for example with a signal to noise ratio that allows some errors. Thus, data may be trusted overall or over time, but possibly an individual bit may not be trusted. Accumulators can gather taints up to a predetermined threshold, after which an action may be taken. A taint can arise from software, can be forwarded from an original source, may result from an attacker attempting to break into a web browser, or may be "operational" for null pointers, buffer overruns, and other faults. In various embodiments and/or conditions, accumulation may be per source, overall, or both. One or more bits can be accumulated per untrusted source. The accumulation can be configured to be subject to various selected algorithms, for example power law, race functions, and the like.

In a power law algorithm, the frequency of a security risk event is presumed to vary as a power of some attribute of the event. The power law relationship is believed to apply to distributions of a wide variety of physical, biological, and man-made phenomena such as sizes of geophysical and weather events, neuronal activity patterns, frequencies of words in various languages, and many other examples.

In a race function, a security risk event is presumed to follow exponential or geometric change, either growth or decay, wherein the rate of change of a mathematical function is proportional to the function's current value.

An accumulator can be configured using any suitable arithmetic or logic element, and can accumulate data in any suitable manner, such as a counter or bit per source, a bit per accumulator. The accumulator can be configured to address information from different sources and at different times in selected distinctive manners. For example, an accumulator can be set so that 99% correct data is sufficient and a clean bit indicated despite occasional errors, while data from another source may be known to be valid only 65% of the time wherein a selected algorithm can be run, for example power law, race function, or the like, to determine validity.

On the specific case of sensor, some errors occur because sensors aren't perfect, a signal to noise characteristic is present so some errors will occur, even in the case that data is usually correct 99% of the time. Thus, the data can be generally trusted cumulatively with some level of trust to individual bits. An entity that is not trusted will have outlier in terms of error rate, not criteria per error rates. In some circumstances one definition of trusted/untrusted can be specified or tracking can be done on source and data basis. In a federated system, tracking can be on the basis of the sensor of one entity against another entity.

Various other accumulator examples can be implemented. A counter per affiliation can be defined wherein a low level is merged up to a higher level. Pathways to a system can track sources of data through a system such as by running data through a specified pathway through a "validator," a software program or hardware logic used to check the validity of multiple taint indicators in terms of security risk. A 2-4-bit counter can be used to track one-bit per source or a counter per source.

Tainting can be performed on a one-bit basis for a small number of sources which can be federated down to whatever sources are desired. An accumulator can be configured to count the number of taints, such as the taints per memory unit (per byte for example). Statistics can be performed on any suitable taint counter—a counter per bit, 2-bit counter, 4-bit counter and the like. Examples of taints and/or events to filter can be used for taint monitoring and creation of a trust profile and include: instructions tainted, the number of tainted instructions, the number of instructions written as a result, the number of data loads and stores, the number of data memory accesses, outputs, calls/returns, branches (for control flow), integer overflows, network I/O, and the like. An integer overflow can be handled as a taint. Integer overflows occur frequently and can be legitimate about half the time, and thus a condition indicating possible error but by no means certainty of error.

Monitoring of network I/O is useful for detecting when a virus attempts to call home. The system can trap to software if any specified taint occurs, a simple reaction for any suspicious event.

Accumulators can be used to build a trust profile over time, such as by using taint information as raw data for creating the trust profile. The trust profile can be used to lower and raise the trust level over time, and to make subsequent decisions. For example, a bit or counter can decay over time to balance race with accumulation.

Any suitable comparisons can be defined for particular conditions. In an illustration, a trust profile of an I/O process can be built over time. In a simple control scheme, a high-risk operation can be monitored so that if the number of taints is greater than a predetermined threshold, I/O can be blocked. Over time, the count can be decremented to account for spurious events.

Suspicious activities can be monitored using comparisons, for example using a counter or a single-bit designating suspicious events. Examples of suspicious activities can include null pointer references which are not always intentional or malware, buffer overruns/overflows which are usually untrusted, repeated attempts to access a key, and the like.

Comparisons can be used to efficiently track suspicious activities, particularly in conditions that complex statistical analysis is unavailable or unwarranted.

A taint vector, operable as an intrusion detection system, can be created for tracking multiple events or conditions. An example taint vector can comprise 16-64 bits corresponding to associated sources, events, conditions, and/or suspicious activities. Each taint vector of a composite vector may correspond to a source of data or a type of activity. Taint vectors enable monitoring and tracking of a large number of resources and conditions or a wide variety of types without burdening the system and operations with a significant amount of hardware and complexity. The taint vector can include a various decay options tailored to the particular information monitored. For example, the taint vector can decay after a certain number of operations to avoid triggering on outlying events. Possibly schemes for implementing decay can include: 1) increment/decrement using a single vector which is incrementing and decrementing is performed on the same vector, 2) copying the vector to memory periodically to maintain on old version while continuously incrementing and decrementing to enable restoration of the old version subsequent to reacting to an invalid or error condition, and 3) impose a decay that is a race of decay versus accumulation.

A taint vector can be configured to introduce a new class or type of security element, not taints but rather suspicious activities including null pointers and buffer overflows. Suspicious events are taints or can be treated and propagated like taints.

The taint vector can be tailored to monitor various comparisons including, for example: are any elements greater than threshold, are all greater than threshold, is the sum of all or some elements greater than threshold, is the sum greater than an intermediate value, and the like. The system can trap if the taint vector meets predetermined conditions.

The taint vector can be considered an accumulator of faux paus, for example null pointer references, attempts to access a secure part of the CPU, buffer overruns (a common hacking technique). The taint vector can be used to monitor events or conditions that are not necessarily attacks or failures but may be innocent or coincidental, but originates in a region that raises suspicion, wherein a feature of the region can raise or lower suspicion. A taint vector can be configured to focus more on the type rather than origin of malicious event or condition that occurs. The taint vector can include primary and secondary criteria, and accumulates suspicious actions while also considering indicial of levels of suspiciousness including extra data and extra identifiers relating to the actions for further analysis. Accordingly, although the taint vector can consider the source of an event or condition in determining suspiciousness, actions, consequences, and usage can be more pertinent to identification of an attack or malicious condition. For example, known system calls are associated with reading data off web pages and thus tagged as suspicious for further analysis in which the source of the system calls can be identified (for example via operating system software that injects a label identifying the source).

The taint vector can be configured to set a hierarchy of suspicion based on the source, type, or identify of an event. For example, a buffer overrun can be considered worse than a null reference. The source of the event can be considered to assign a level of suspicion such as whether the sensor from a known and trusted bank or an unknown bank or foreign hack site.

Information can reach the taint vector from multiple various sources. For example, some system calls are associated with accessing information from web pages. These calls are tagged and the operating system injects a label indicating that the data originated from a web browser at a particular identified site. The protocol for receiving a taint notice for tainting originating in a remote system outside the system which controls the taint vector can be that the taint notice is placed by software as some level, possibly software in the remote system. The taint notice is received from software from various sources such as by forwarding from the originating source, determined by a person attempting to write to a web browser, originating from suspicious operations or faults (such as buffer overflows), and, generally, from an indication that data has some level of questionability.

The taint vector can be implemented to include tolerances set based on questionability of the source or event. Zero tolerance can be set for particularly suspicious or harmful events and/or sources wherein a single event can result in a maximum response. For a low threshold, the response for one taint can result in a trap, exception, or shutdown, and may be used, for example, in nuclear power plant control.

A medium threshold can be a hybrid of low and high threshold and call for a medium response and include aspects of decay. An illustrative setting for medium threshold may allow two taints per hour and thus have decay of one taint per half hour. In a typical condition such as one buffer overflow per X amount of real time or CPU time or other interval, a monitor tracks events. Decay is implemented to account for rare and spurious events that are likely to occur by chance when monitoring continuously for vast time spans, and do not surpass threshold for an error condition. Decay is thus is imposed upon accumulation so triggering occurs when more events per unit time (other interval, instruction cycles, and the like) than accommodated by decay are indicative of an error condition. If events occur too often, the threshold of rate of occurrences indicative of suspiciousness (taint rate) is too high and the threshold can be reset.

An example of high threshold can allow twelve taint counts per unit time such as for cheap video forwarded from a provider or signals from ubiquitous cell phones. Most events can be ignored in the absence of some indication of attack. Thresholds are set to balance a sufficient level of security with communications characterized by large amounts of data and frequent errors.

If taints exceed the threshold, then suspicion if sufficiently great that some action or response is taken. A suitable response can be trap, exception, notification, alarms, and the like.

In various system embodiments, taint vectors can be configured at selected locations and with selected granularity. A simple system can have a single taint bit. A slightly more complex system can have a single taint vector allocating multiple entries. Additional control and functionality can be attained by assigning a taint vector per register, for example to track computer processor register EAX (in 32-bit Intel Architecture IA-32) while not tracking register EBX.

A taint vector can be configured to track memory taints, for example tracking every byte in a computationally and resource expensive arrangement. In contrast, a less extensive implementation can assign a single taint for all memory such as with 64 entries. A vector of 64 entries may have one bad indicator operable as a running gauge of operations. The taint vector can indicate on/off status or a range.

Taints can be allocated by memory page which can be challenging for usage with Intel processors since no free bits are available and page tables are read-only. To address this challenge, a system can include a memory taint hash table which, if read-only, can indicate a level of taint per memory block. A read-only memory prevents logging of taints in memory so that the table is located outside of the read-only memory. The amount of memory for the table can be reduced by using a hash. Memory at the hash of an address can be used to compress the address, for example 4 gigabytes (GB) can compress to a 64-kb table. A special instruction can be specified in which store memory at a specified address receives a predetermined value.

Taints can be allocated by byte to attain the finest possible granularity. A special instruction can be specified in which memory at a specified address has a taint field equal to a predetermined taint field value. Another example special instruction can be specified to create a taint hash vector in which memory receives a specified hash of the address where the hash is operable to compress the address, for example 4-GB of memory can be compressed to a 64-kb table. Once the hash is performed, security is no longer determinant or precise so that false positives can occur. The false positives can be addressed using intrusion detection capabilities of the system. The taint hash vector is costly in terms of resources, possibly 1-2 bits per byte maximum—a substantial amount of overhead.

A taint vector can be configured to segregate memory by type, for example distinguishing memory for storing program code from memory for storing data. Different types of segments can be allocated for corresponding different granularities of taint information.

Taints can be allocated by hardware process identifier (PID). For example, one vector can be allocated per hardware thread to address context switching wherein a software thread's vector is stored.

In another option, taints can be allocated wherein a cross-thread taint is enabled, for example to address some system-wide taint.

In various embodiments, the operation of tainting can be allocated among hardware devices and components and software. In a particular embodiment, hardware can track taints while software can inject initial taint notifications, except when hardware can determine a priori that an event or operation is bad. In example functionality, hardware can generate a trap to software according to predetermined "trap-if" rules that are most suitable selected so that rules are simple and easy to describe, are activated in response to a specific condition, and easy to implement. A trap can be activated based on selected threshold conditions.

In various system embodiments, taint vectors can be configured with selected decay and using selected decay mechanisms. Decay can be applied periodically for example either on a consistent basis or with a varying period based on a sensitivity meter. Characteristics of the sensitivity meter such as rate of subtraction can be selected based on the environment of a system, for example whether a computer is running on a home network, a business environment, a public network, and the like.

Decay methods can include subtraction of selected number N or shifting the taint vector in an interval of time, instruction count, or other suitable metric (time periods, processor frequency or cycles, and the like). The decay parameter and rate can be programmable. The rate and/or period can vary with the sensitivity meter, also possibly in a programmable manner, based on conditions such as type of network (home, public, work), activity (gaming, web browsing, office or scientific applications), and other conditions, for example multiple taints from a known particularly untrustworthy source. The rate and/or period can also vary according to hardware environment or perspective, for example whether the hardware is constrained to a fixed rate or enabled for a programmable rate such as via a register loaded by software with pertinent information.

A special instruction can be created to facilitate setting of the sensitivity meter. The instruction can operate in conjunction with the operating system to read a register indicating the level of protection and can change the rate in response to operation of the sensitivity meter.

A Taint Adjustment Vector (TAV) can be formed to adjust rate and period dynamically. The TAV can comprise a timer register which can automatically decrement a set of rates. In an example of TAV operation, the TAV including one or more taint adjustment vector parameters can be applied to the Taint Vector (TV) upon expiration of the timer. In various implementations, the TAV can be applied to the TV by adding the TAV to TV, adding a delta, adding another selected value, shifting, shift-add, multiply, divide. Multiple timers can be used to enable decay for one type of information to be different from decay for another type of information. Taint Adjustment Vectors or timers can be universal over multiple Taint Vectors or per Taint Vector.

A special instruction, for example a system-level "set taint vector parameter" instruction, can be created to support the TAV. The instruction can act under operating system control in conjunction with multiple timers, each of which controls a set of taint adjustment parameter vectors (TAVs) which are used to adjust the current taint vector. The instruction can set the TAV and/or timer. The instruction can write to a control register and allocate the control register in control register space as a TAV or timer.

Another technique for delay can be recursive addition of a Taint Bias Vector (TBV) to the Taint Vector (TV), enabling the operating system to create complicated algorithms in the operating system time stamp independently of hardware operation and thus enabling flexibility in modifying, selecting, and executing the algorithms. The algorithms can generally include primitive operations such as a shift, an add, and a subtract, although any suitable operation can be performed. TBV can be larger in number of bits than TV. Bias can constrain software functionality, for example increasing or decreasing the level of sensitivity based on relatively complicated factors since the software may not be completely trusted. Bias can also constrain operation by preventing instant decay (bias may not be allowed to fully eliminate security), although the operating system can be configured to authorize or enable setting of instant decay.

In various system embodiments, taint vectors can be configured with selected taint elements to describe selected taint events.

Accidental/non-malicious overflows can be taint events. Taint handling can be constituted to handle legitimate overflows which can occur sporadically and can be expected to occur. Overflows are examples of known problems. Special instructions can be created to address such known problems. Hints can be used in association with instructions, for example by hint instructions which are dedicated to hint handling or by adding a hint bit field to an instruction. In the case of overflow, a hint can be used to notify that a particular instruction, for example the next instruction, may overflow.

Hint handling can be added to a taint vector, or to an "ignore problems" variety of taint vector. For example, a HINT instruction can be constituted that, rather than the occurrence of a taint causing accumulation of the taint vector, a count can be added to an Ignore Problems Taint Vector (IPTV).

A predictive hint can also be used to allocate resources. For example, a software routine can use a hint a prediction of a significant amount of floating point usage. A HINT instruction can be included in the routine. In another version, at the beginning of a library function, code can be inserted to enable predictive preferential scheduling. The HINT instruction can be part of the library, for example at the beginning, or associated with the library. Code can be inserted in the library, such as at the beginning of a library function requesting particular resources, for example for preferential scheduling. In one example form, a call to a system call can request the operating system to allocate more resources. In another example form, a hint instruction can be sent to hardware to implement the hint and the hardware responds by using the hint in hardware scheduling, such as push, pop, pull, stack, or the like. The hint instruction typically has no direct effect on program execution. The program will run correctly except for changes in performance and battery life.

Predictive hints can also be implemented other than with a hint instruction. Rather than an instruction, the hint may be part of the data structure. For example, X number of bits can relate to expected capabilities to which a process can be entitled such as a vector or a structure. Software can determine information for a performance descriptor, then fills in the data so that metadata of a descriptor determines importance of the performance descriptor.

Accordingly, predictive hints can be implemented in hardware, software, the instruction set architecture, or a combination of configurations. Hardware is typically more constrained than a software implementation. A software library enables the hint to be passed in a linked list of hash trees for passage into hardware, for example as a 128-bit or 256-bit register. Such an implementation can be implemented in an application programming interface (API) but sufficiently simple to be part of hardware. Thus, the API can be designed, then simplified sufficiently to put into hardware.

Referring to FIGS. 1A, 1B, 1C, 1D, and 1E respectively, first, second, third, and fourth schematic block diagrams, and a graphical data description depict embodiments of a computing system 100 adapted to manage security risk by accumulating and monitoring taint indications, and responding to predetermined taint conditions detecting by the monitoring. The computing system 100 can comprise an interface 102 operable to receive a plurality of taint indicators 104 indicative of potential security risk from a plurality of distinct sources 106 at distinct times. The computing system 100 can further comprise logic 108 operable to accumulate the plurality of taint indicators 104 independently using a corresponding plurality of distinct accumulation functions 110 and operable to assess security risk according to a risk assessment function 112 that is cumulative of the plurality of taint indicators 104.

In some embodiments of the computing system 100, the interface 102 can be further operable to receive the plurality of taint indicators 104 indicative of potential security risk associated with information used by the computing device 100.

In various embodiments, the computing system 100 can handle taint indicators 104 according to a selected granularity. For example, the logic 108 can be operable to accumulate the plurality of taint indicators 104 on a basis selected from a group consisting of per-source, per-data, overall, and combination.

Taints can be generated on the basis of questionability of the data and of other aspects of operation and condition such as prior negative experience or lack of familiarity with a data source or entity. For example, the computing system 100 can be configured wherein the logic 108 is further operable to determine whether information from a particular source or entity is trusted based on assessment of security risk.

In various embodiments, the computing system 100 can be constituted to implement a wide range of accumulation functions 110. For example, the logic 108 can be further operable to use one or more of a corresponding plurality of distinct accumulation functions 110 such as comparing ones of the accumulated plurality of taint indicators 104 to at least one predetermined threshold, performing power law analysis, and/or performing a race function. Other suitable accumulation functions 110 can operate by counting various occurrences or aspects of operation such as counting the number of taints 114, counting the number of taints 114 per memory unit 116, counting the number of instructions 118 tainted, counting the number of tainted instructions 118, counting the number of instructions written as a result of a taint 114, counting the number of data loads and stores, counting the number of memory accesses, counting the number of calls, counting the number of returns, and counting the number of branches. Still other counting aspects of accumulation functions 110 can include counting the number of integer overflows, counting the number of network input/output events, counting the number of null pointer references, counting the number of buffer overruns/overflows, counting the number of repeated attempts to access a key, and the like. Suitable accumulation functions 110 can be used to monitor any aspect of operation.

Figure 1B:
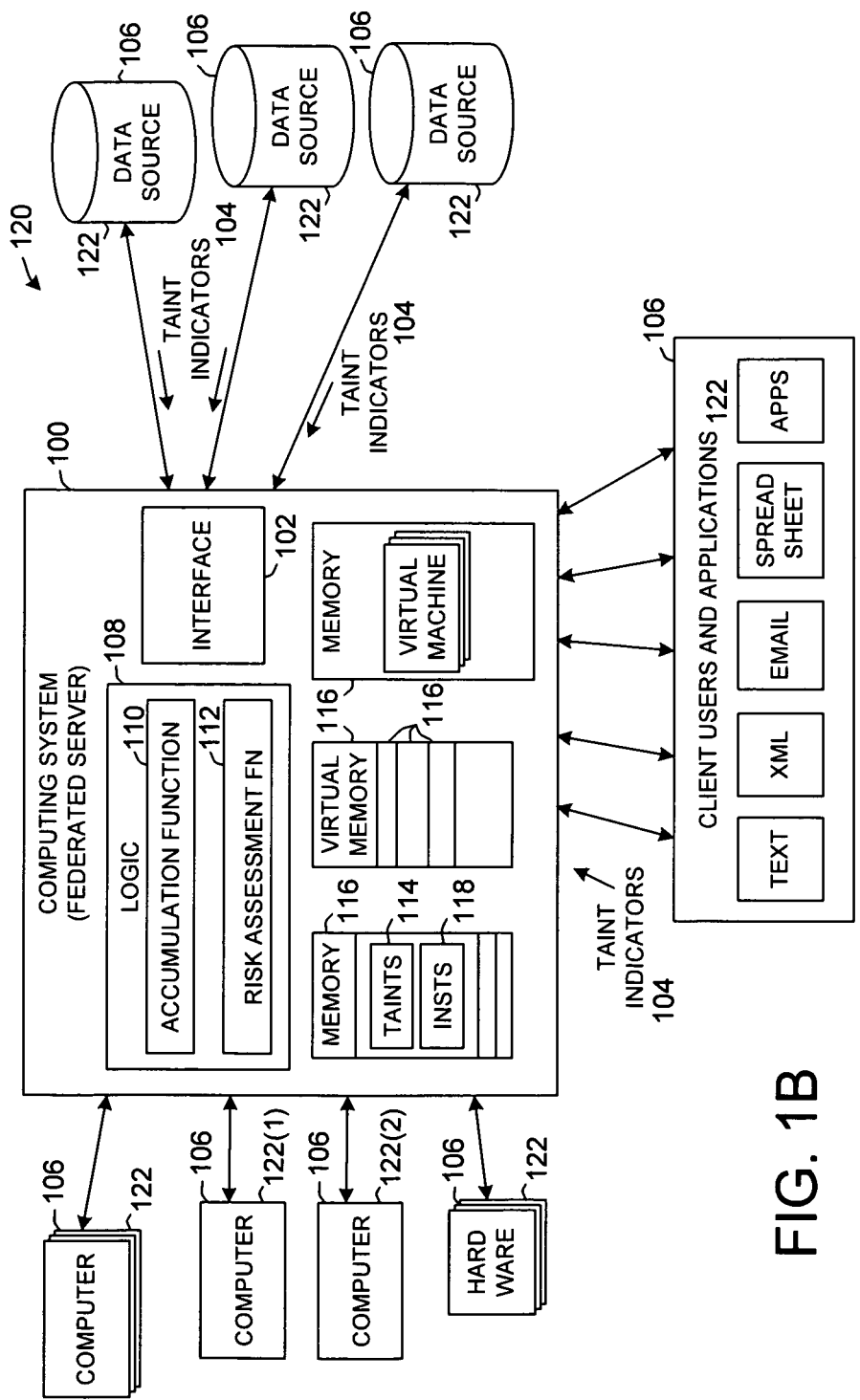

Referring to FIG. 1B, a computing system 100 can be operable as at least part of a federated system 120 which can be implemented in an infrastructure such as an architecture including servers and clients. For example, gaming code servers and gaming console clients can interact by running program code that executes in part on machines controlled by the server and in part on machines controlled by the client. Intrusion detection via accumulation of taints can enable the interaction to be mutually trusted by both sides. In an illustrative embodiment, the computing system 100 can be operable as at least part of a federated system 120 comprising a least a first entity 122(1) and a second entity 122(2). The logic 108 can be further operable to track at least one of the plurality of taint indicators 104 of the first entity 122(1) against at least one of the plurality of taint indicators 104 of the second entity 122(2).

In some embodiments, the computing system 100 can be configured wherein the logic 108 is further operable to accumulate the plurality of taint indicators 104 comprising counting taint indicators 104 affiliated with a plurality of entities 122 per affiliation and to merge a low level for a plurality of affiliations up to a higher level.

Figure 1C:
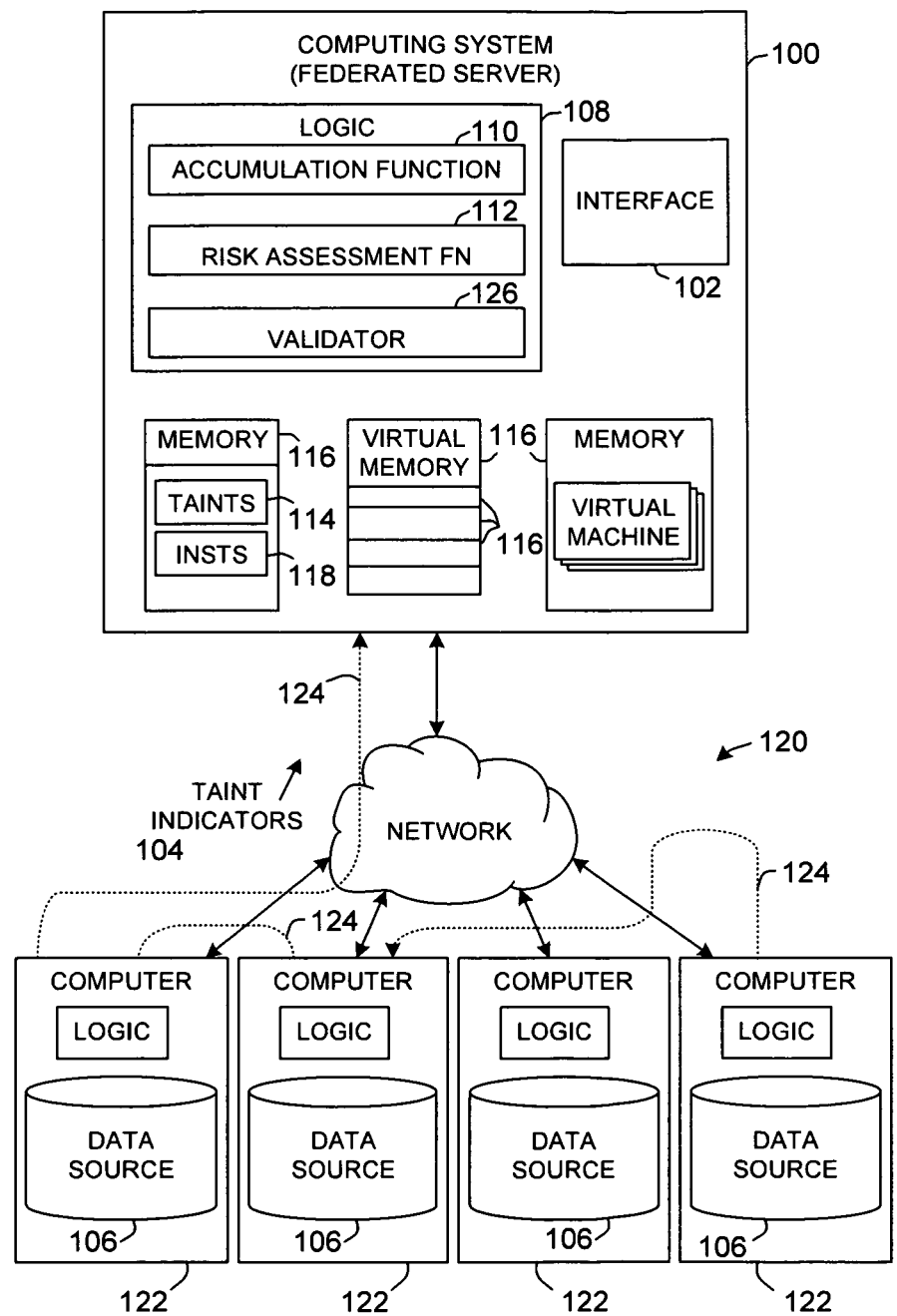

In a further aspect of operation, shown in FIG. 1C, embodiments of the computing system 100 can be constituted wherein the logic 108 is further operable to define a plurality of pathways 124 through a federated system 120, track sources 106 of information through the federated system 120, and pass information of a specified pathway 124 of the plurality of pathways 124 through a validator 126.

Figure 1D:
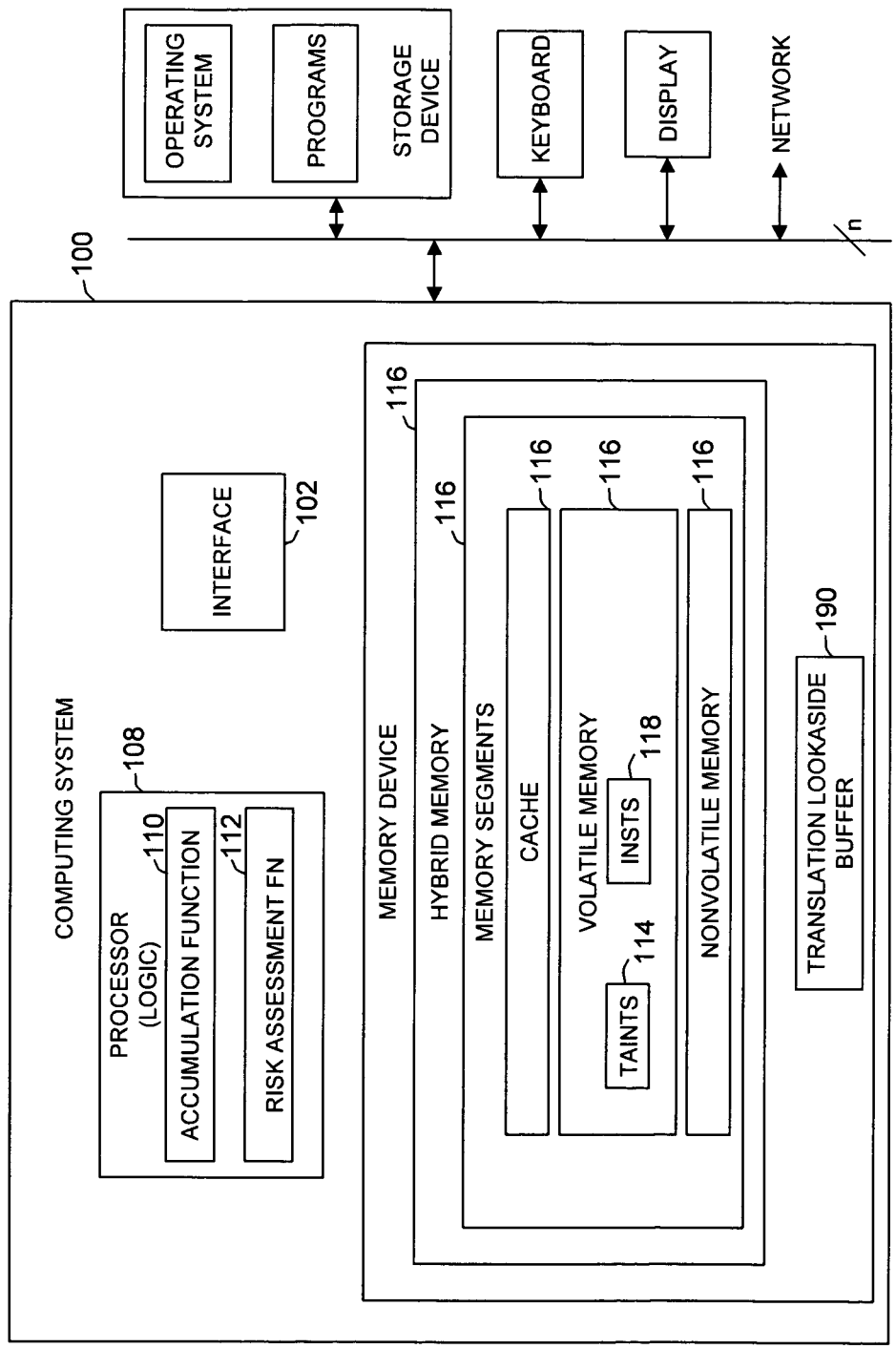

Referring to FIG. 1D, a computing system 100 can be operable as at least part of a networked system including multiple computing devices such as computing system 100 which interfaces with remote and potentially untrusted computers and may be the source of security risk events such as attacks. Security risk events or attacks can arise from other sources including computing devices and systems, storage and devices inside a firewall or local to a targeted machine. In general, computers and networks can represent a variety of local or globally distributed systems and networks that can supply information via a plethora of communication channels and protocols such as the Internet.

Security risk events and attacks can originate remote from a local and potentially trusted network, and can similarly originate from local users, systems, devices, and storage. Accordingly, the computing system 100 can be constituted to address security risk events that arise from a local device such as keyboard, network interface, communication devices, local storage including memory and long-term storage devices, and other computers and systems.

The systems and techniques disclosed herein are operable in the context of physical hardware and software-oriented configurations. The systems and techniques are further operable for embodiment as virtual computers and devices presented or emulated within a virtualization system. Thus, the computing system 100 can be used in physical hardware systems, virtualized systems, and combination systems with both physical and virtual aspects, with functionality distributed across devices or systems. Thus, taint information can be received from a source remote from a targeted system, such as from an interface, a network, a gateway, remote computer, or the like.

Taint information can be received from some source and can be destined for some target storage location and downstream usage. Information or data can be considered tainted, potentially tainted, suspect, or known untainted based on multiple criteria. Tainted information or events are defined according to a particular implementation and security policy in a range from "of interest," potentially untrusted, and suspect to untrusted, potentially dangerous, and malicious. Information can be considered tainted based on entity including source, target, and interface; and also based on characteristics or conditions of information receipt such as conveying protocol or transaction; or based on a combination of considerations.

Figure 1E:
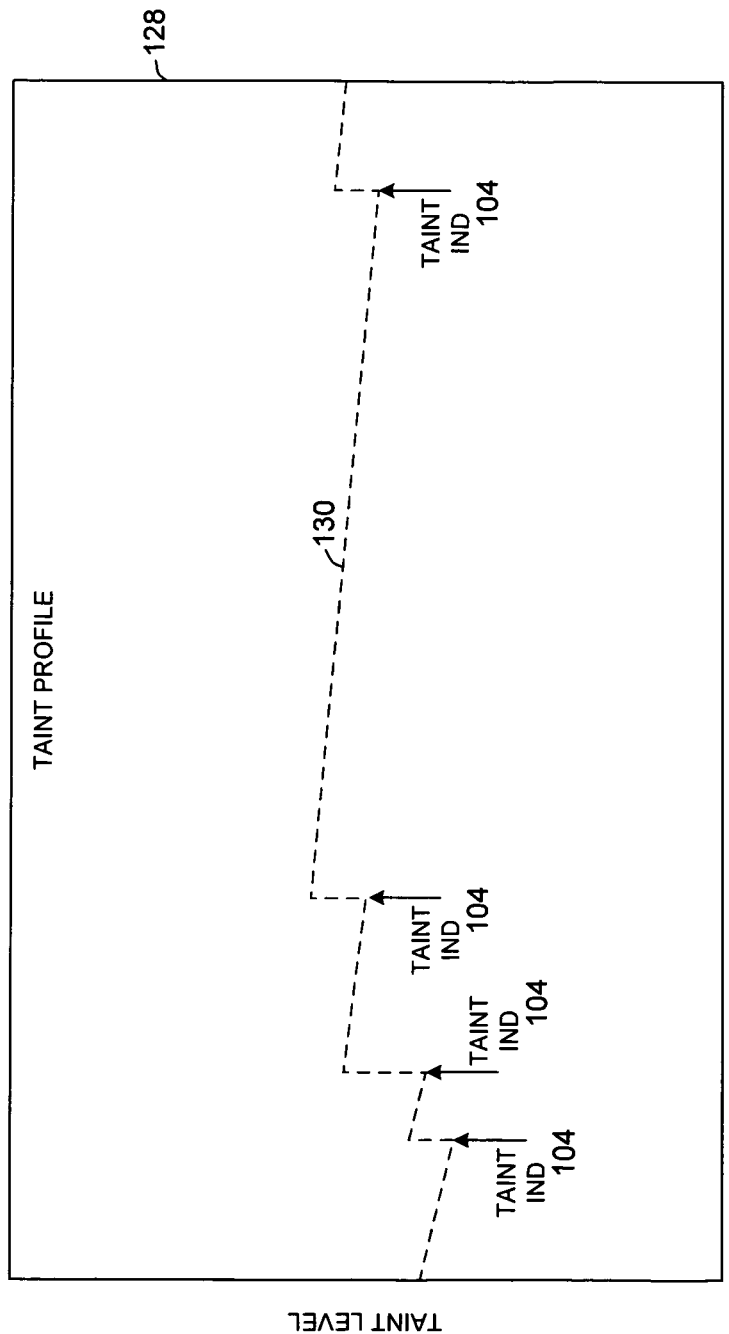

Referring to FIG. 1E, a graphical data description shows an example operation that can be executed by the computing system 100 to facilitate intrusion detection using taint accumulation. In an illustrative embodiment, the logic 108 can be further operable to form a trust profile 128 using the accumulated plurality of taint indicators 104, dynamically raise and lower trust level 130 of the trust profile 128 based on the accumulated plurality of taint indicators 104, and respond to security risk in response to the trust level 130.

Referring again to FIG. 1D, a taint indicator can be generated in association with operation of a translation lookaside buffer (TLB) 190. A translation lookaside buffer (TLB) 190 is a processor cache which can be used by memory management hardware to improve virtual address translation speed. Processors use a TLB to map virtual and physical address spaces. TLB are used widely in hardware which uses virtual memory.

The TLB 190 can be implemented as content-addressable memory (CAM), using a CAM search key which is the virtual address to produce a search result which is a physical address. If the TLB holds the requested address—called a TLB hit, the CAM search quickly yields a match and the retrieved physical address can be used to access memory. If the TLB does not hold the requested address—a TLB miss, the translation proceeds by looking up the page table in a process called a page walk. The page walk is computationally expensive process, involving reading contents of multiple memory locations and using the contents to compute the physical address. After the page walk determines the physical address, the virtual address to physical address mapping is entered into the TLB.

A stream monitoring instruction can be implemented to improve efficiency and performance of the TLB by supporting a software predictor. The instruction can be used to monitor misaligned or split access. A memory access is aligned when the data item accessed is n-bytes long and the data item address is n-byte aligned. Otherwise, the memory access is misaligned. Monitoring for misaligned access can be performed by hardware, resulting in a trap, or somewhat less efficiently by software. In practice, monitoring for misaligned access has a high false positive rate, for example approaching 90%. A predictor can be configured, for example by micro-architecture adjustment or taint accumulation, to indicate whether the misaligned access hits are accurate.

A processor can be configured to change voltage, frequency, and/or power based on the number of cache misses. For example, logic can accumulate taint indicators to detect an abundance of cache misses or other performance problems, the voltage can be varied such as increased to cure the problem. The logic can dynamically adjust operating parameters according to the amount of traffic. Frequency and voltage can be adjusted, for example whenever a change in frequency occurs, the voltage can be modified accordingly.

Logic in a memory interface can detect when memory is full to some threshold level, for example 70%, for example by accumulating taint indicators. If memory is full to the threshold level, a predetermined taint indicator condition is found, and a high level of access is occurring, memory speed can decrease. In response, the frequency and voltage of operation can be dynamically increased to maintain a desired memory speed.

In various embodiments, logic for performing dynamic adjustment can be positioned in memory, in a logic interface, in a processor. A hardware configuration can optimize by active adjustment, redirection, or possibly a combination of adjustment and redirection. For example, a computation-intensive process with many instructions to be executed rapidly can be addressed by running the processor at a higher rate by increasing operating frequency and voltage, and/or some of the burden can be shifted to components other than the processor to maintain processor execution at a lower frequency.

Taint accumulation can also be used to allocate system resources. Various aspects of resource allocation include hardware threading, computational limits, pooled resources, entitlements, and others. Resource allocation can be handled via various architectural aspects of a system including microarchitecture, instruction set architecture (ISA), operating system, library calls, and taint accumulation. Software can associate capabilities with particular library functions or software objects. This software can be in the form of compiler, operating system, or others. The operating system can, for example, create a profile for any process running floating point operations and give that entitlement. Resources allocated include processors, central processing units (CPUs), graphics hardware, network controllers, memory, memory management, other hardware, and the like. Resources further include power, cycles, and the like.

Hardware Threading

Several aspects of hardware threading are currently implemented in processors such as CPUs. Simultaneous threading (SMT), hyperthreading, or simultaneous hyperthreading relate to hardware execution of two or four threads selected for running at any time, managed according to many fine-grained scheduling decisions. In a cycle, two threads are selected at instruction fetch, typically at the front of the pipeline and hardware determines which of the two thread's instructions to fetch. An instruction for each of the threads pass to an out-of-order machine within which the instructions are running concurrently. For example, an arithmetic logic unit (ALU) instruction from thread 1 and a memory instruction from thread 2 can run simultaneously.

Another type of hardware threading is interleaved multithreading (IMT) which removes all data dependency stalls from the execution pipeline. One thread is relatively independent from other threads so the probability of one instruction in one pipeline stage needing an output from an older instruction in the pipeline is low. IMT is conceptually similar to pre-emptive multi-tasking used in operating systems.

In contrast to CPU multithreading which handle relatively few threads (typically two or four threads), graphics processing units (GPUs) are stream processors for computer graphics hardware and manage hundreds or thousands of threads, thus using much more sophisticated scheduling. When blocking occurs, for example on a cache miss such as from a memory reference, a very large number of threads are blocked. Threads are chosen for execution on massively parallel thread arrays. In a typical arrangement, a processor has approximately 64,000 threads of which only about a thousand execute at one time. Underlying operations during execution include scheduling, addressing cache misses, and the like. Rather than scheduling from a memory pool, GPUs schedule instructions for execution from a very large pool of threads, waiting for memory to become available to run the next thread.

A CPU can be configured for a CPU thread hierarchy which includes a currently running list and a pool of non-running threads enabled to receive information pertinent to computational limits from devices or components such as special-purpose hardware. In an illustrative embodiment, the information pertinent to computational limits can be monitored via taint indication and taint accumulation, and resources allocated accordingly.

Computational limits can be imposed via generation of taint indicators and taint accumulation. A limit on computation can be imposed according to setting of priority level which is, in turn, based on available resources. One example resource that can be monitored to set limits on computation is the battery. Limits on computation can be imposed based on battery consumption, battery life remaining. Computational limits can be addressed via a framework of setting capabilities, for example specifying a capability to execute on selected processing resources. In an example implementation, the capability can be set up in metadata.

Taint accumulation is suitable for managing computational limits since addressing computational limits can be fairly complex, involving not only information from monitored resources but also user input. For example, a determination by hardware of low battery level and associated limited battery life can be overridden by a user who may request a software application to run in anticipation of being able to soon recharge the battery at a line power source.

Performance capabilities can be used in combination with taint accumulation to manage resources. A performance capabilities framework can be defined to address handling of a pool of available resources. A thread pool pattern can be configured wherein a number of threads are created to perform a number of tasks which are typically organized in a queue. Usually, the number of tasks is greater than the number of threads. A thread upon completing an associated task will request the next task from the queue until all tasks have completed. The thread can then terminate or become inactive until new tasks are available. The number of threads can be tuned to improve performance, and can be dynamically updated based on the number of waiting tasks. Increasing the size of the thread pool can result in higher resource usage.

A hardware scheduler can respond to any countable or measurable operating condition or parameter, for example electrons, constraints, frequency, cycles, power, voltage, and the like, to control the thread pool and pool of resources. The countable or measurable operating conditions and/or parameters can be monitored over time using taint accumulation. Two highly useful conditions or parameters for monitoring are power and cycles, which are the basis for other measurable phenomena. Monitoring of operating conditions can be performed in hardware or via software call.

Furthermore, software can associate capabilities with particular objects such as libraries.

In an example embodiment, a software model can be configured to use and enforce performance capabilities. In a relatively simple operation, if power is too low, then the software can limit the maximum number of threads or other capabilities. For example, in a cell processor case the number of threads can be limited to less than 1000. Fundamentally, software can disable functionality if sufficient power is unavailable for scheduled operations.

In another example, a sensor or sensors can detect whether battery bias voltage level is recovering too slowly or, similarly, a thermistor can indicate a battery is too hot which may indicate operating at too aggressive a level. A bit or bits can be set indicating the recovery time is too long. The set bit(s) can be used to throttle the maximum thread hopping rate in the case of a CPU with two threads. The bits disallow a thread hop and set an allowable rate of thread hopping; or perhaps allow thread hopping which creates slowing but saves power.

An example of performance capability monitoring and management can be implemented in a CPU with four process threads each having instruction pointers. One of the four threads is selected to execute for next instruction cycle. Various types of information can be monitored to determine which thread to select including recent demand for power, memory, CPU cycles, and the like. For example, a process can be a resource glutton and allocated fewer resources to enable other processes priority. Information is available relating to recent performance, requested performance, and acceptable performance (niceness).

Another option is to use a "NICE" instruction which can be used to adjust the priority level of predetermined instructions, enabling the instructions to be run in the background at a convenient time. For example, if a processor or battery is running too hot, the NICE instruction can reduce the urgency of executing code. In a particular example implementation, the NICE instruction can change a multiplier and step of a decay algorithm.

High and low capabilities can be specified. For example, a particular software routine can sometimes, although rarely, use floating point operations so the capability for such routines can be set low. Operations performed by software can include monitoring, configuring parameters, and the like.

Figure 2A:
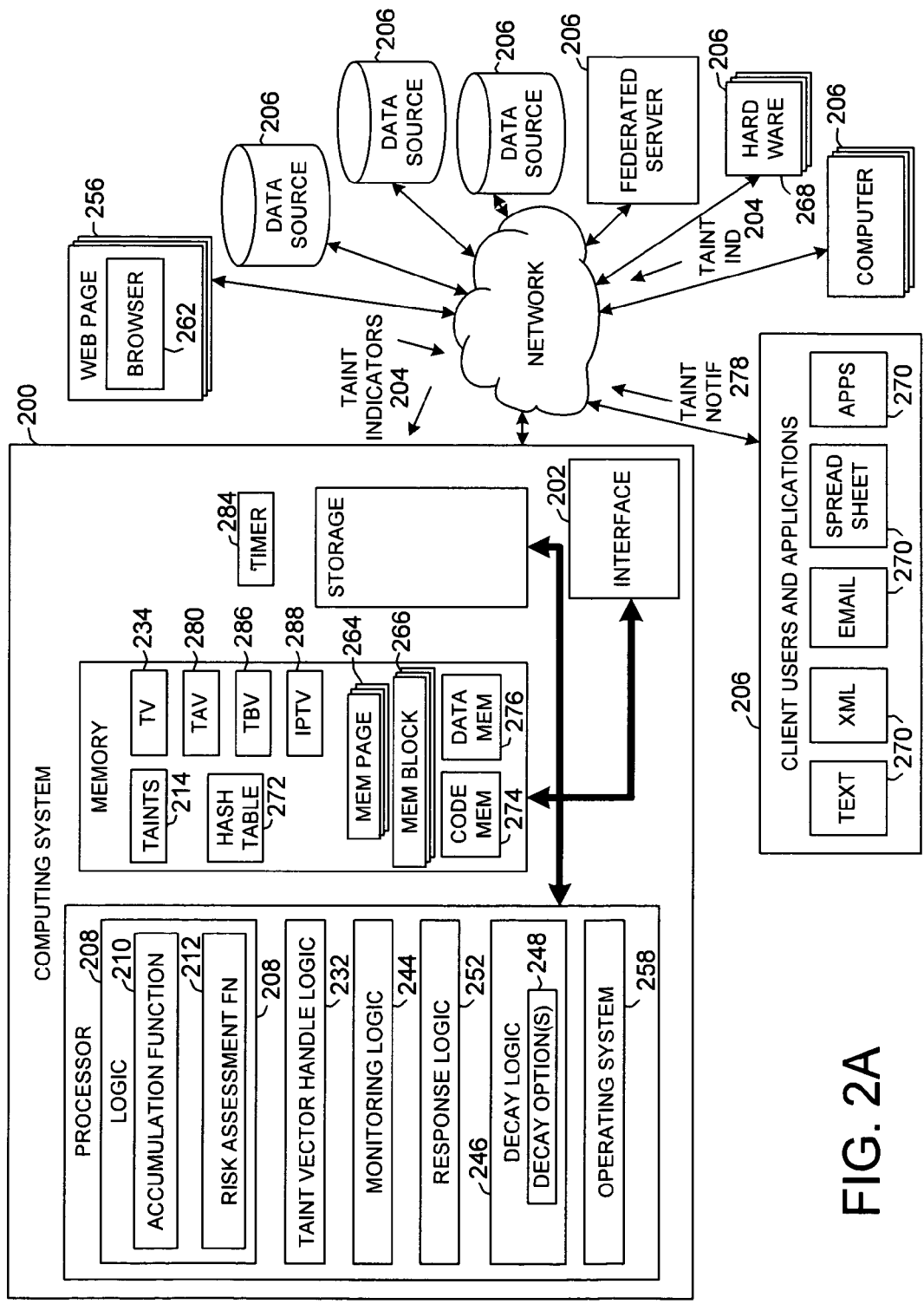
FIGS. 2A, 2B, 2C, 2D, and 2E are, respectively, a schematic block diagram and four data structure diagrams illustrating an embodiment or embodiments of a computing system adapted to manage security risk by specifying and using a taint vector to monitor and, in some embodiments, respond to predetermined taint conditions.
Figure 2B:
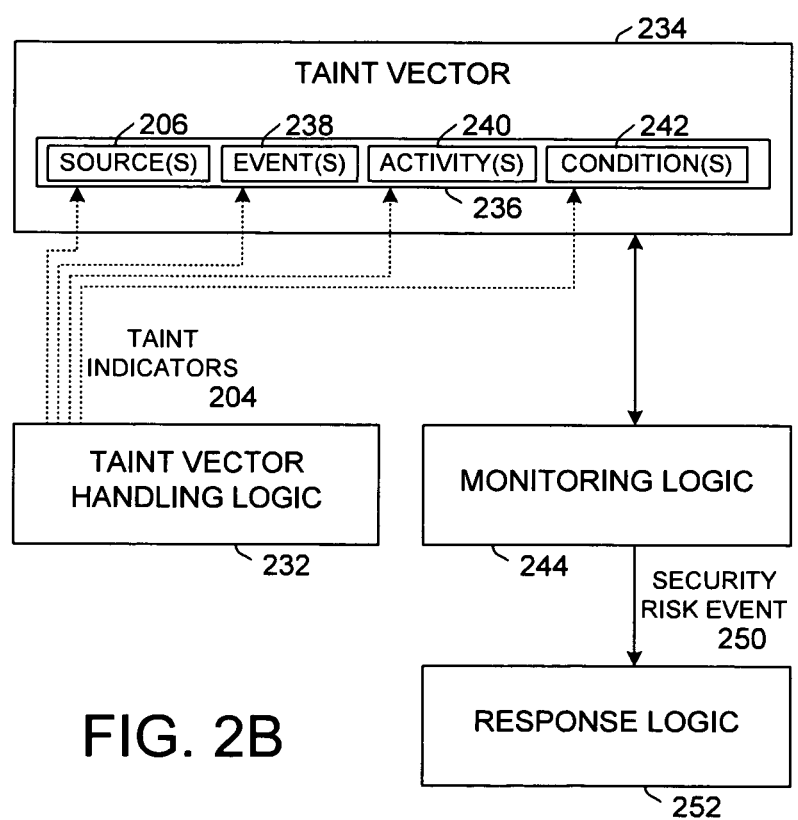

Referring to FIGS. 2A, 2B, 2C, 2D, and 2E respectively, a schematic block diagram and four data structure diagrams illustrate an embodiment or embodiments of a computing system 200 adapted to manage security risk by specifying and using a taint vector to monitor and, in some embodiments, respond to predetermined taint conditions. FIGS. 2A and 2B show a computing system 200 and associated data structure used by the computing system 200. The computing system 200 can comprise taint vector handling logic 232 operable to specify a plurality of bit fields 236 of a taint vector 234 corresponding to plurality of sources 206, events 238, activities 240, and/or conditions 242. The taint vector handling logic 232 can be further operable to assign a plurality of taint indicators 204 indicative of potential security risk to the bit fields 236 of the taint vector 234. The computing system 200 can further comprise monitoring logic 244 operable to monitor the plurality of sources 206, events 238, activities 240, and/or conditions 242 over time using the taint vector 234.

In some embodiments, the computing system 200 can further comprise an interface 202 and logic 208. The interface 202 can be operable to receive the plurality of taint indicators 204 from a plurality of distinct sources 206 at distinct times. The logic 208 can be operable to accumulate the plurality of taint indicators 204 in the bit fields 236 of the taint vector 234 independently using a corresponding plurality of distinct accumulation functions 210. The logic 208 can be further operable to assess security risk according to a risk assessment function 212 that is cumulative of the plurality of taint indicators 204.

In some embodiments, the computing system 200 can manage intrusion detection by applying decay functionality to the taint vector 234. For example, the computing system 200 can further comprise decay logic 246 operable to specify a plurality of decay options corresponding to the plurality of taint indicators 204 according to information type. The decay logic 246 can be further operable to apply the decay options 248 to the bit fields 236 of the taint vector 234.

In various embodiments, the computing system 200 can further comprise decay logic 246 operable to specify at least one of a plurality of decay options 248 selected from applying decay after a predetermined number of operations to avoid triggering on outlying events, setting decay to account for rare and spurious events with a probability of occurrence by chance during long term monitoring, incrementing/decrementing using a single vector, and/or subtracting a predetermined number. Other suitable decay options 248 can include shifting a taint vector 234 in an interval of time, shifting a taint vector 234 at a predetermined instruction count, shifting a taint vector 234 at a predetermined processor cycle count, copying a taint vector 234 periodically to memory to maintain an old version while incrementing/decrementing to enable restoration following an invalid or error condition, and imposing decay that balances accumulation. Further examples of suitable decay options 248 can include applying decay periodically, applying decay with a varying period that varies based on a sensitivity meter, applying decay with a varying period that varies based on environment, applying decay with a varying period that varies based on activity type, applying decay according to a programmable parameter at a programmable rate, and the like.

In various embodiments, the monitoring logic 244 can be constituted to perform various tracking and monitoring operations to enable enhanced detection of intrusion. For example, in some embodiments the computing system 200 can be configured wherein the monitoring logic 244 is further operable to track taint indicators 204 characterized by a range of taintedness from potentially suspicious to definite taints 214.

The monitoring logic 244 can be constructed to perform various comparisons to indicate error or intrusion. For example, the computing system 200 can be configured wherein the monitoring logic 244 is further operable to monitor comparisons selected from a group including determining whether any elements are greater than a predetermined threshold, determining whether all elements are greater than a predetermined threshold, determining whether the sum of some elements is greater than a predetermined threshold, determining whether the sum of all elements is greater than a predetermined threshold, and the like.

The computing system 200 can be configured to discern actual security risks from innocent and/or coincidental events. For example, in some embodiments the monitoring logic 244 can be operable to monitor the plurality of sources 206, events 238, activities 240, and/or conditions 242 to detect and discern one or more potentially innocent and/or coincidental events such as null pointer references, attempts to secure part of a processor, innocent and/or coincidental events arising from a region that raises suspicion, and the like.

In various embodiments and/or conditions, the computing system 200 can include response logic 252 for responding to a detected security risk event and/or condition. For example, the computing system 200 can further comprise response logic 252 operable to determine at least one security risk event 250 as a result of monitoring the plurality of sources 206, events 238, activities 240, and/or conditions 242, and respond to security risk in response to determination of the at least one security risk event 250.

The computing system 200 can respond to the detected security risk event and/or condition in a predetermined manner. For example, various embodiments of the computing system 200 can comprise response logic 252 operable to respond to security risk upon determination of the at least one security risk event 250 by at least one response selected from various responses including ignoring the at least one security risk event 250, logging the at least one security risk event 250, displaying a notification, displaying a warning message, generating an alarm, and the like. Other responses can extend beyond passing of information to dynamic management and control of system operations such as preventing a memory and/or register write, modifying operating frequency, modifying operating voltage, modifying an operating parameter, performing a system call, and the like. Even more drastic responses can terminate a particular process, and end operations of some or all resources, for example by calling a trap and/or exception, terminating operation of selected resources, activating a system shutdown, and the like.

The taint vector handling logic 232 can be configured to manage or control various aspects of operation. For example, in some embodiments the computing system 200 can be configured wherein the taint vector handling logic 232 is operable to configure the bit fields 236 of the taint vector 234 to include primary and secondary criteria corresponding to selected taint indicators 204 and to include information and/or identifiers relating to actions, consequences, and usage.

Similarly, in some embodiments the computing system 200 can be constituted wherein the taint vector handling logic 232 is operable to configure the bit fields 236 of the taint vector 234 to set a hierarchy of suspicion based on source, type, and/or identity of an event 238.

Figure 2C:
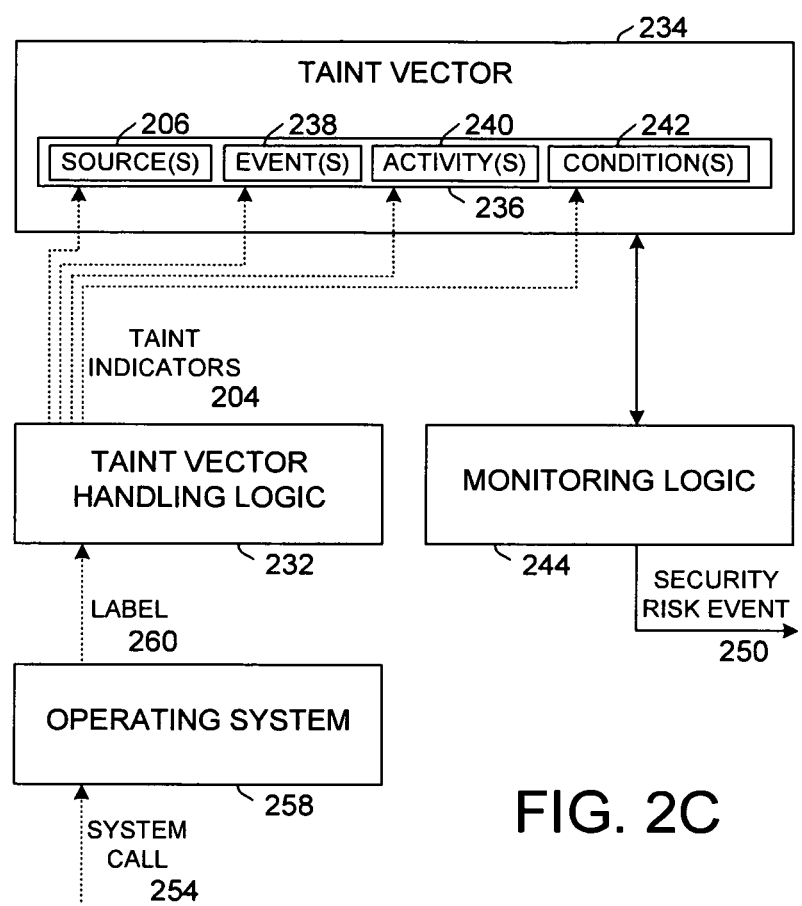

Referring to FIG. 2A in combination with FIG. 2C, the computing system 200 can be constructed to manage taints passed via network such as the Internet. For example, the computing system 200 can be configured such that the taint vector handling logic 232 is operable to receive taint indicators 204 from a tagged system call 254 associated with accessing information from a web page 256 wherein an operating system 258 injects a label 260 indicating origination from a browser 262 at an identified site.

The computing system 200 can be arranged in some embodiments and/or under specified conditions to monitor taints on the basis of source or event which originates data, rather than aspects of the data itself, such that the taint vector handling logic 232 is operable to configure the bit fields 236 of the taint vector 234 to include tolerances based on questionability of a source and/or event.

In various embodiments and/or conditions, the computing system 200 can be configured to address intrusion at different levels of granularity. For example, the taint vector handling logic 232 can be operable to configure the bit fields 236 of the taint vector 234 at a selected granularity including a taint bit per entry, a taint bit per register, a taint bit per multiple entries, a taint vector 234 per entry, a taint vector 234 per register, and a taint vector 234 allocating multiple entries.

Accordingly, in various embodiments and/or conditions, the computing system 200 can be configured wherein the taint vector handling logic 232 is operable to allocate taints 214 at a selected granularity such as allocating taints 214 by memory page 264, allocating taints 214 by byte, allocating taints 214 by word, allocating taints 214 by memory block 266, allocating taints 214 by hardware process identifier (PID), allocating taints 214 to enable a cross-thread taint 214, allocating taints 214 among hardware devices 268, allocating taints 214 by component, allocating taints 214 by software component 270, and the like.

In various embodiments, the taint vector handling logic 232 can be constituted with a wide variety of functionality. For example, in some embodiments, the computing system 200 can be configured for handling a memory taint hash wherein the taint vector handling logic 232 is operable to form a memory taint hash table 272 and use the memory taint hash table 272 to indicate a level of taint per memory block 266.

In some embodiments, the computing system 200 can be further configured wherein the taint vector handling logic 232 can be operable to access a memory taint hash table 272 and indicate a level of taint per memory block 266 using the memory taint hash table 272.

The taint vector handling logic 232 can be constituted to segregate memory in a variety of ways. For example, in some embodiments the computing system 200 can be formed wherein the taint vector handling logic 232 is operable to configure a taint vector 234 to segregate memory by type.

In particular embodiments, as selected, the computing system 200 can be arranged wherein the taint vector handling logic 232 can be operable to configure a taint vector 234 to segregate memory by type at a selected granularity.

Similarly, some embodiments of the computing system 200 can be formed wherein the taint vector handling logic 232 is operable to configure a taint vector 234 to segregate memory between program code memory 274 and data memory 276.

In various embodiments, taint indicators 204 and taint notifications 278 can be generated from any suitable source including either software, hardware, or other components and devices of computing system 200, or from any source remote from the computing system 200 such as a network, other systems connected to the network, and the like. In a particular example, the computing system 200 can be configured wherein the taint vector handling logic 232 is operable to track taints 214 using hardware devices 268 and insert initial taint notifications 278 using software components 270.

Figure 2D:
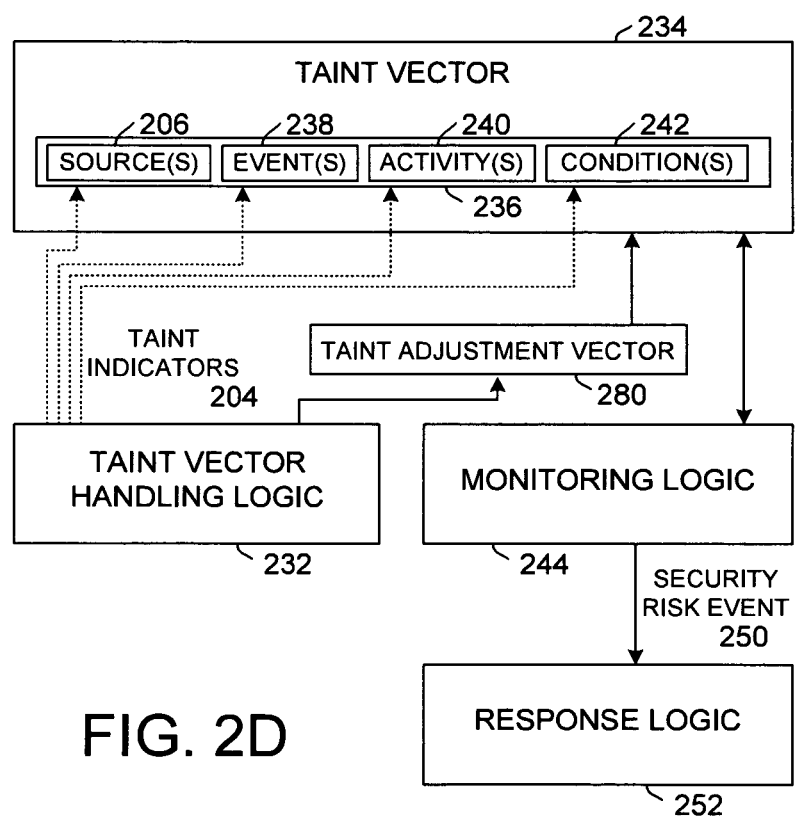
Figure 2E:
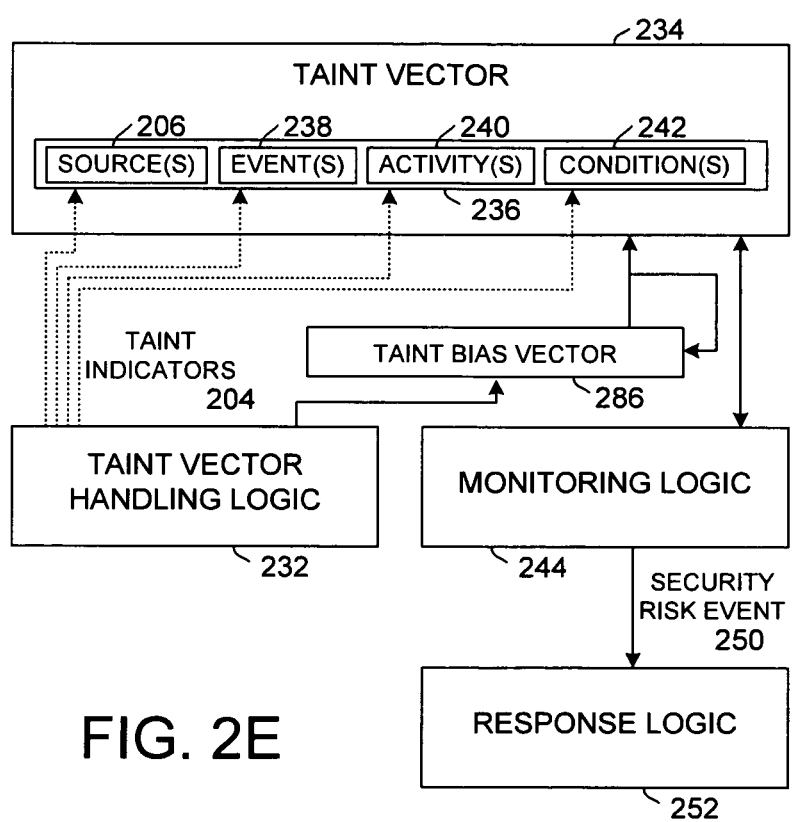

Referring to FIG. 2A in combination with FIG. 2D, the taint vector handling logic 232 can be formed and/or operated in various manners to manage updating of the taint vector 214. For example, in some embodiments the computing system 200 can be formed wherein the taint vector handling logic 232 is operable to dynamically adjust rate and period of updating the taint vector 214 using a taint adjustment vector 280 comprising at least one parameter.

Similarly, the computing system 200 can be constructed wherein the taint vector handling logic 232 can be operable to automatically decrement a set of rates using at least one timer 284, and apply at least one parameter of the taint adjustment vector 280 to the taint vector 234 upon expiration of the at least one timer 284.

In a wide variety of implementations, embodiments, and conditions, the taint vector handling logic 232 can be constructed and operated in several manners, as desired. For example, the computing system 200 can be formed or operated wherein the taint vector handling logic 232 is operable to apply at least one parameter of the taint adjustment vector 280 to the taint vector 234 according to at least one action of actions including adding the taint adjustment vector 280 to the taint vector 234, adding a delta of the taint adjustment vector 280 to the taint vector 234, adding a predetermined value to the taint vector 234, shifting the taint vector 234 as directed by the taint adjustment vector 280, shifting and adding to the taint vector 234 as directed by the taint adjustment vector 280, multiplying the taint vector 234 as directed by the taint adjustment vector 280, dividing the taint vector 234 as directed by the taint adjustment vector 280, and any other suitable action. Similarly, as shown in FIG. 2A in combination with FIG. 2E, the computing system 200 can be formed or operated wherein the taint vector handling logic 232 is operable to recursively add a taint bias vector 286 to the taint vector 234.

In various embodiments and/or conditions, the computing system 200 can be operated to ignore events that may or may not indicate potential intrusion wherein the taint vector handling logic 232 can be operable to determine whether to ignore one or more taint indicators 204, and to log occurrences of the ignored one or more taint indicators 204 in a ignore problems taint vector 288.

Capabilities can be used to implement security. Typically, a system has only a few predetermined capabilities. However, a system can be configured in which every memory addressing register is assigned a capability. If the register specifies a capability to access the associated memory location, the location can be accessed. Otherwise, access is prohibited, for example producing a fault or incrementing a counter or accumulator, such as a taint accumulator, which can be noted in an intrusion vector. For any aspect related to security, if a test is failed, the counter is incremented and placed in the intrusion vector.

An instruction can be specified in an instruction set which sets a capability. In various embodiments, the instruction can be implemented in software, hardware, the operating system, or the like. The instruction can operate in association with a capabilities vector. In some embodiments, the instruction can also or otherwise operate in association with a hint vector.

The capabilities vector can be associated with a pointer, an address, and an object. A highly basic capability is a lower bound and an upper bound. Other more complex capabilities can be implemented. In various implementations, the capabilities vector and the entitlement vector can be separate, or can be combined. Merging the capabilities vector and the entitlement vector enables software structuring.

The capabilities vector can be used to enable fine-grained permission. Fine-grained permission facilitates operations of multiple users or entities in a shared memory data base, enabling the multiple users to access storage such as disk and to perform system calls, but limit access to data only to the user who owns the data or is authorized to access the data. Another benefit of fine-grained permissions is an ability to facilitate and improve security while multiplexing software threads onto hardware threads. In an example configuration, 64000 software threads are multiplexed onto only four hardware threads. Only a small portion of the software threads are running at one time with the remaining software threads idle. The software threads alternately run on the hardware threads, then go back to idle to allow other software threads to run.

A classic security hole in a database management is the inability to limit access to data for the different software threads multiplexed onto the hardware threads. A database typically does not allocate a hardware thread to a user. In typical database operation, a request is received and placed on a software thread so that users are multiplexed onto the software threads, an action giving very little protection. Better protection is attained by allocating each user to a separate process, a technique that is prohibitively expensive because the threads are expensive. Multiplexing the users onto software threads leaves a security hole because access to a particular user's data allowed while running the user's software thread on a hardware thread is not removed when the user's software thread is swapped out from the hardware thread. The access permission remains so access remains enabled. The depicted system solves the security hole by using capabilities.

In a non-capabilities system, any of the software threads can access the entire database at any time, including any data that has been placed in shared memory (unless a call out is made through the operating system to enable any of the threads to create I/O, a prohibitively expensive operation). Simple databases only have one peer thread so all threads can access any data. Many typical databases have 64 threads that can access any data in shared memory but only four threads that can access I/O. These systems sometimes have different privilege levels (for example, Intel's rings 0, 1, 2, 3) so specify compatibility. Most code runs in ring 3 and the kernel in ring 0. Rings 1 and 2 are generally not used although several databases have features that can run in ring 1 and ring 2 but are rare and used primarily for benchmarks (a benchmark hack).

In an example implementation that uses capabilities, generally a processor has 16 or 32 registers, some of which are addressing registers. A capability can be loaded to enable access to selected threads. A capability can be loaded to access a particular thread (owned by another user) into hardware thread 0, enabling running as that user. This is one type of context switch—to change the software thread that is executing on hardware thread 0. The capability registers can then be changed, a minor context switch and a change in privilege level. The action does not invalidate translation lookaside buffer (TLBs), but rather moves the permissions out of the TLB. The access control model is also changed. Capabilities can be used in this manner to change operations, guaranteeing only access to data and/or resources for which access is allowed by a permission-granting entity. Capabilities can guarantee a transitive exposure of only the data and/or resources of another user according to granted authorization. The technique is deterministic so that, by inspection, which accesses are possible is known.

Intrusion detection can use the concept of capabilities to implement fine-grained security.

Entitlements can be monitored using taint accumulation. Entitlements can be used to allocate resources. Entitlements can be defined as user-specified rights wherein a process is entitled to a predetermined percentage of power or of time. A scheduler or chooser can monitor entitlement values and schedule the next highest priority process. A particular scheme can allocate modulo by bit to avoid starving a process with lower entitlement. In some conditions, the level of entitlement can be overridden or adjusted. Entitlement can be set according to a predetermined algorithm which defines a "fair share" for the processes, for example round-robin, history-based, randomized, and the like, which are efficient since a large history need not be accumulated. Thus, an efficient and inexpensive hardware implementation is possible. In some embodiments, a request for resources can be treated as a taint indicator and accumulated using a taint accumulator or taint vector to determine how to allocate among processes.

A metric can be specified which enables modification of a goal. A selected level of entitlement to resource consumption can be assigned to each process. One example scheme can be a short, low complexity method which is implemented while storing a limited operation history. For example, when running low on battery charge, a sequence 1-2-3-4-4-3-2-1 can be used to determine whether any of the processes is a resource glutton and can rank the processes on order of gluttony. The most gluttonous can be assigned the lowest priority. Another option can rank processes according to gluttony in combination with another factor of goodness (niceness). Processes can be ranked for the next cycle with the most gluttonous given last priority or can be ranked according to gluttony and one other nice system criterion. Monitoring and/or control can be performed highly efficiently if hardware, although either monitoring can be performed either in hardware or software in various embodiments. Power management units in CPUs can be used for monitoring, for example to monitor for increases or decreases in voltage or frequency, and for thread execution selection.

Capabilities can be used to perform monitoring and allocation of resources. For example, granting the capability to run video processing software can be combined with simultaneous granting of power capability.

Power is typically global to a process or to an individual CPU. Use of capabilities enables more refined control of power, for example power can be made specific to an object or library routine. With power global to a process, the process will continue to run in absence of a fault, a page fault, a disk access, or the like, and will run until blocked by the operating system scheduler, allowing high power consumption. Use of capabilities enables power to be controlled on a per-hardware thread granularity. Use of capabilities further enables power to be controlled specific to a per-hardware thread granularity for throttling power.

Processors can use instruction prefetch to improve execution speed by reducing wait states. The processor prefetches an instruction by request from main memory before the instruction is needed and, when retrieved from memory, placing the prefetched instruction in a cache. When needed, the instruction is quickly accessed from the cache. Prefetch can be used in combination with a branch prediction algorithm which anticipates results of execution to fetch predicted instructions in advance. Prefetches conventionally operate independently. In some embodiments, a processor disclosed herein can prefetch according to holistic monitoring of operating conditions such as voltage, frequency, and the like to more accurately determine or predict which instructions to prefetch.

The cache can be reconfigured dynamically, for example beginning with a single large, slow cache which can be divided into a relatively small subcache and a larger subcache to enable faster operation. In embodiments disclosed herein, operating characteristics can be monitored to generate information for dynamic reconfiguring of the cache. In some embodiments, cache phenomena such as cache hits and misses can be handled as taint indicators for taint accumulation, for example using a taint vector, to facilitate handling of the cache. As a result of the monitored operating conditions, the cache can be selectively configured for slower or faster speed, larger and smaller cache subregions. In some conditions, part of the cache can be temporarily disabled, for example to save power. Monitoring of operating conditions can enable a suitable balance of considerations to determine whether part of the cache is to be disabled, for example determining whether the power saved in disabling part of the cache is appropriate in light of the power lost with a greater cache miss rate.

Disclosed system and method embodiments can use operating condition monitoring and holistic control at the level of calling an object. In an object-level paradigm, various objects or values (such as numbers, symbols, strings, and the like) can be combined to form other objects or values until the final result objects or values are obtained. New values can be formed from existing values by the application of various value-to-value functions, such as addition, concatenation, matrix inversion, and the like. Various objects have different impacts on system operations.

An example of an object which, when called, can have large consumption of power or other resources is video encoding which is a brute force, unintelligent algorithm which runs much more efficiently on dedicated hardware than a general CPU, and has real-time constraints. Video conferencing has similar real-time constraints.

Another object example is video games which perform many different tasks concurrently including processing geometry and processing video simultaneously, possibly processing speech for Skype communications, voice compression, input/output, and the like. Video games thus typically involve concurrent operation of multiple objects such as the game processing tasks and interface (Application Programming Interface, API) that perform different actions separately. The multiple objects are commonly run as separate threads, unless prohibitive due to the large amount of overhead in running threads that are not essential. Separate threads simplify programming.

In some configurations, applications, and conditions, multiple threads can be run wherein the threads need not be run in the same context.

Hyperthreading is a particular implementation of hardware threading. Software threading is a slightly different implementation of threading wherein the threads are often, but not always, related. In some implementations, a processor can include a GOAL register that can be used to set performance characteristics for particular threads. For example, if different routines (Skype, physics) are run in different threads, selected operating characteristics for the threads can be loaded into the GOAL register to give the threads separate issues. Allocating priority to the different threads can be difficult. In an illustrative system, priority to the threads can be allocated using a NICE utility which specifies acceptable performance for a particular operation and allows reduced priority in appropriate conditions for tasks that can be assigned lower priority with little or no consequence.

In an example implementation, priorities, particular types of priorities, and entitlements can be associated with particular library routines to facilitate management of relatively heuristic phenomena. A library can be constituted wherein entitlements are assigned to individual library routines. The library includes information for adjusting the priority of threads, for example by identifying a phenomenon as a taint indication and accumulating taint indications. In some configurations or applications, the library can support hint vectors, such as branch prediction hints to specify whether static prediction should be taken or not taken. In some embodiments, the library can be configured to support NICE-type handling of a hint vector.

A process scheduler can be constituted to support prioritized entitlements and resource allocations upon calling selected libraries. A typical embodiment includes such support in software, although hardware support can also be implemented. For example, a network library can include library routines adapted for heavy network usage so that resources giving access to the network are more important processes to schedule. More entitlements are allocated to network-related resources. Libraries can also be configured to handle secondary priorities that change dynamically. For example, a sound card can have a greater power priority and have a pattern of operation wherein a process uses a network card and possibly other subsystems in combination with the sound card. Thus, the network card and other subsystems can also be allocated a higher priority. Similarly, for a process which performs less modeling and number computation in lieu of higher input/output operations and sending of information, a higher level of priority can be allocated to input/output resources.

Entitlements can be used to specify operations of a library. For example, a library with entitlement to run a predetermined number of floating point operations per second can, in response to a condition of executing instructions with few or no floating point computations, use the condition as a hint to power down floating point hardware, thus saving power. Thus, if computations include fixed point operations but no floating point operations, an a priori indicator can be generated designating that the floating point hardware is not needed in the near future and can be powered down. A process can call a library and, if known that a resource is not needed, the resource can be temporarily halted, thereby changing the entitlement level of that process with respect to the resource (for example a floating point unit) to a very low point.

In the illustrative example, the entitlement level of the process with respect to the floating point unit can be changed to very low because the resource is not needed for a foreseeable duration. The process thus indicates to other processes a willingness to relinquish access to the source, for example a willingness to be "nice" about allowing others to use the resource, so that access is deferred in favor of any other process that uses the resource, or the resource is shut down if not currently needed by another process.

Rather than have hardware determine demand for a resource after instructions have been executed, the illustrative system and method can use a call to a library or the result of making a call to the library as an indicator of entitlement niceness. This entitlement can be enforced in the manner of capabilities, for example by requesting access to a memory region, a request which may be denied. The library can give information regarding entitlement, thus giving a priori knowledge.

Resource allocation can also be managed using hints. An illustrative instruction that uses a hint is a hint that not much floating point computation is to be performed, a hint indicative of power demand. For example, hints to maintain power at a low level or to maintain power at a high level. An exception can create problems when using hints, since a hint is not unwound in the event of an exception. For example, for a hint to maintain high power, an exception which changes the condition but does not reset the hint allows hardware to remain in a high power mode, potentially forever. Examples of problems with hint processing in conditions of context switching include problems with unlocking memory locations.

In contrast to entitlements, capabilities enable mechanisms to unwind.

Entitlement Vector can be used as part of or in affiliation with taint accumulation or a taint vector for managing resources. An entitlement vector can have multiple fields, for example including floating point, power, arithmetic logic unit (ALU), graphics triangle including any suitable entitlements, translation lookaside buffers TLBs, virtual memory usage, and the like. The entitlement vector can thus be used, for example, to power down the TLB as no longer relevant to operation, or to enable usage of a wide range of virtual memory.

Another field of the entitlement vector can specify scale. Examples of scale can be human scale, width of the accumulator, or any suitable scale. For example, for a finger print, a suitable scale can be no more than 2 MB.

A further field of the entitlement vector can be data path width, a similar concept to scale. A large instruction size, for example 1024 bits, wastes power, but typically only a portion of the bits are used at one time so that a desired subset of the bits can be activated, changing the data path width. The scale concept leads to the concept of a selected partial data path width. The data path width is part of the entitlement. For example, of 1024 bits logic can compute the number of bits actually needed and allocate that predetermined subset of bits, such as 128 bits. The data path field thus can be used to lower the data path width used of the available entitlement vector width, for example activating a super-accumulator data path width.

In an example software embodiment, software can monitor the system over history, or can be preprogrammed, and fills in some sets in entitlement vector fields. Software can determine values for the fields and fill in the bits of data, possibly associated as a lookup table, an associated hash table, an extra field to call for a library, and the like. For a library call, an entitlement vector EV is returned. The entitlement vector can be received from various sources, for example from external to calling software. For example, the entitlement vector EV may be installed into hardware as a side effect of the library call.

A factor in determining whether the entitlement vector is handled in software or hardware is the size of the vector.

In an example hardware implementation, a suitable entitlement vector size is 256 bits, although any suitable size is possible. For example, a vector of 64K bits is generally considered too large for hardware implementation.

In some embodiments, an entitlement vector can be associated with each library. The entitlement vector can be used, for example, to eliminate floating point if desired, reduce the number of floating point operations if such operations are rarely used, reduce the scale as appropriate when full accumulator width is unnecessary, increase support for the ALU.

The entitlement vector can be implemented as a call with a memory address made in association with a call to a library which, for example, can return a pointer or address location to the entitlement vector.

Another field of the entitlement vector can be a chooser/thread selector. The entitlement vector can be used by the chooser/scheduler, which includes logic that performs operations based on a single entitlement vector or possibly relative entitlement vectors. Each Instruction Pointer (IP) or thread can have an associated entitlement vector. For example instruction pointers, for IP1, IP2, IP3, IP4, then four entitlement vectors can be allocated. Chooser/scheduler logic considers the entitlement vector when scheduling the next thread for computation. The logic informs the chooser/scheduler about how to make the selection. The logic can perform selected functions to make the choice and for scheduling, for example by elevating or decreasing priority of a thread.

An example function using an entitlement vector (EV) can compute the sum of weight$_i$ times EV$_i$ compared to the usage vector of Thread$_i$, a simple target function for evaluating when to schedule threads from the highest priority to the lowest priority. Thus, for a thread with high priority and large requirement for resources, the thread can be elevated in the scheduling list and resources are likely to be allocated. In contrast, a thread that is a glutton for resources and has low priority is likely to be deferred by the scheduler, moving back or to the end of the list of scheduled threads. A high priority thread that consumes only limited resources is likely to be moved up in the schedule list, possibly to the front of the list.

In some embodiments, the entitlement vector supplied by a HINT instruction can be modified by a capability process. Illustratively, the entitlement vector can set entitlement to use X resources which can be limited by the operating system for example by reduced weighting or setting of maximum allowed resources. The entitlement vector can also be limited according to usage, wherein a thread using an inordinately large amount of resources can be limited when the high usage is detected or predicted.

The entitlement vector function $F_i(w_i, EV_i, v_i)$ of weight ($w_i$), entitlement vector ($EV_i$), and resource volume ($v_i$) can be either linear or non-linear.

The entitlement vector enables association of scheduling with functions. The entitlement vector further enables association of priority with functions.

One of the challenges in allocating resources is the potential for highly unpredictable changes in resource demand. For example, minor changes in workload can result in substantial variation in performance. Another challenge is unpredictable behavior in response to context switches from one process to another. One technique for dealing with these challenges is making a library call as a technique for determining whether a context switch occurred or, if not expecting to make a library call, perform an action that randomizes priority. If degradation results from making the library call, then performance can be monitored to determine whether performance is reduced. If so, priority of the threads can be randomized. Example techniques for randomization can include a Boltzmann search, simulated annealing, hop-around, other lateral computing techniques, and the like. A Boltzmann search can be performed by a Boltzmann machine, a stochastic recurrent neural network that is capable of learning internal representations and solving combinatoric problems. Simulated annealing is a computer technique used for answering difficult and complex problems based on simulation of how pure crystals form from a heated gaseous state. Instead of minimizing the energy of a block of metal or maximizing strength, the program can minimize or maximize an objective relevant to the problem at hand, specifically randomization to attain stable performance. In a hop-around technique, priority or other parameters can be bounced around to determine a local maximum but not global optimum. Search optimizations can be used to determine whether truly at a maximum value. The new results can be compared with an old optimum.

In some embodiments, a supervisor circuit, for example for thermal and/or overvoltage protection, can modify the entitlement vector.

The entitlement vector, for example in combination with a usage vector and/or taint accumulation monitoring, can be used for monitoring power control. In various embodiments, power control monitoring can be performed remotely or locally, possibly by the operating system.

In an example embodiment, a user can supply an entitlement vector using instructions, for example by specification of the beginning and end of a function. The entitlement vector can be used in association with a performance monitoring unit which monitors and determines other entitlement vectors. In various embodiments, the entitlement vectors can be maintained separately or combined into a single effective entitlement vector.

Context switches can be specified as taint indications for usage in taint accumulation. Context switches can be defined as switches from one process to another. In contrast, a thread can typically be considered limited to a single context. Standard threads and mock threads share resources including context and can have multiple processes, multiple threads within the same privilege level technically. However, a threading library and threading operating system can be created wherein threads are not limited to the same context. Threads can comprise simply a stack and an instruction pointer, and can run in the same address space, for example threads can run as different users in the same address space. In a case of multiple users accessing the same database, if the database is a shared-memory database, software or an interpreter can be responsible for ensuring that unauthorized user(s) cannot access certain data. In the case of users assigned different privilege levels or different threads in the same virtual memory address space assigned different privilege levels, different registers are assigned to particular users and/or threads, and thus switches between users and/or threads are context switches.

Privileges can be associated with a page, a page table, an actual physical memory address, a virtual memory address, and the like.

Capabilities and entitlement can be used in combination with taint accumulation for managing resources. In some embodiments, the capabilities vector and the entitlement vector can be merged. In some aspects of operation, entitlement can be considered to be a capability. With entitlements specified, the associated performance capabilities and management of associated capabilities prevents unauthorized access to data and/or resources, and prevents system takeover, unless specifically allowed or enabled by a system call, improving security and enabling denial of service to attacks.

Merged capabilities and entitlement can be used to prevent microarchitectural denial of service. Denial of service is typically considered to arise from a hacker on a network blocking access by using up all or a substantial part of network bandwidth. For example, when operating on a virtual machine in a cloud computing platform (such as Amazon Elastic Compute Cloud (EC2)) a job can be run that thrashes the cache, resulting in an architectural denial of service in response. Preventative remedies can include checking for performance counters and preventing such unauthorized accesses. Microarchitectural remedies can also be used such as implementing microarchitectural covert channels in which, for various types of code, secret keys running on the same virtual machine can be detected. Similarly, microarchitectural covert channels can be used to monitor timing of code to detect intrusion and to detect whether a bit is set in a particular bit position which may indicate intrusion. Microarchitectural techniques can thus include timing channels and covert channels for use whenever a shared resource is to be modulated. Covert channels can be applied, for example, in modulating a disk arm, detecting seeks on a file system.

In various embodiments, operations implementing and using the entitlement vector can be executed by software in a processor, by microcode, in logic, in hardware, or the like.

An infrastructure configured to support multiple processors in a system can have a shared memory and message passing between threads, processes, processors, and the like. Operating systems (OS) can include various mechanisms to enable message passing, for example pipelines, daemons that use sockets, loopback, and the like. Any suitable number of processors can be supported in the system, from relatively small systems with few processors to large scale systems with hundreds of thousands or millions of processors. In a typical large scale system, the multitudes of processors communicate via fat trees which support the large amount of bandwidth demanded by the large scale system. The amount of bandwidth in different positions in the tree is variable, depending on traffic. In various other configurations, the many processors can communicate via meshes or buses, via Gigabit Ethernet, via CDMA-CE (Code Division Multiple Access—series CE), and the like. In large interconnects, the number of processors determines what functionality is attainable. For example, for more than about 1000 processors, memory can no longer be shared. At around 100 processors, memory space can be shared but cache-coherence is typically not possible and memory is thus non-cache-coherent shared memory. Cache-coherence is generally considered to cause problems for more than about sixteen processors so that fewer processors at a first level can have cache-coherent shared memory.

For a supercomputer or other system with the large number of processors, for example more than about 1000, for which memory is non-shared, Message Passing Interface (MPI) can be used for communication. MPI uses multiple threads but does not use shared memory. The MPI multiple threads are all part of local shared memory, but no global shared memory exists. The amount of local shared memory is limited, resulting in a communications bottleneck. Supercomputer memories use Message Passing Interface (MPI) which, to a first order, includes a limited number of instructions such as send some location, buffer, end buffer, and receive some entity, buffer, end buffer, and the like. MPI is an application programming interface (API) and is thus a library call. The received entity can be, for example, a channel connecting the sender and the receiver, although channels are rarely used in MPI since channels do not scale beyond about a thousand processors. Accordingly, MPI can use commands with masks which identify which processors are to receive a message. A difficulty with MPI is that different code must be written, and a different core engine and interface, for small-scale and large-scale parallelism. Thus, send-and-receive communication such as is used by MPI is suitable if memory is shared.

What is desired is a technique for expanding send-and-receive communication more broadly. In accordance with system and method embodiments, a communications application programming interface (API) can be created that enables communication between different types of threads and hides that the threads are sharing memory. The communications API can enhance functionality of a Transmission Control Protocol (TCP) socket. The TCP socket, also termed an Internet socket for network socket, is an endpoint of a bidirectional inter-process communication flow across and Internet Protocol (IP)-based computer network such as the Internet. In some embodiments, the communications API can also incorporate functionality of MPI into that of a TCP socket. In a distributed system, a processor can communicate with a Network Interface Controller (NIC) and a send instruction puts data on a queue to send to the NIC and pass through the routing network to a specified destination. The communications API can perform communications via TCP-IP, in some configurations optimizing aspects of TCP-IP such as by ordering packets, and also via other protocols. The communications API can include send-and-receive functionality, and include one or more channels, which is operable with TCP-IP. Some of the channels can be shared memory in the form of a buffer with a counter. Some channels can connect to the NIC, some channels to TCP-IP, and some channels can have other functionality. In some embodiments, the communications API can support different types of channels. One example of a channel type is simply registers. Another type of channel can run two hardware threads with a pipeline coupled between the two threads.

The communications API can be adapted to handle the possibility of overflow. For example, for a channel implemented as shared registers, filling the registers to capacity can cause overflow to memory, which can call a trap or exception. In some embodiments, an overflow condition can be specified as a taint indication and accumulated for resource management.

Another technique for expanding send-and-receive communication more broadly can comprise creating a message passing infrastructure in hardware. Speed is one advantage of forming the message passing infrastructure in hardware. For example in the case of a system call, conventionally a slow operation, hardware can be configured to support a send instruction operable to check a bit in a channel selected for the send operation to determine whether the channel is available and, if not, performing a system call by faulting to the system call. Thus, the hardware can be configured to pass execution through the operating system in response to desired conditions.

In an example embodiment, the message passing infrastructure hardware can be configured to avoid passing execution through the operating system, for example to avoid the context switch inherent with going to the operating system. In another example embodiment, the hardware can be configured to include a message passing paradigm and one core can be run in ring 0 to enable access to operating system calls. The operating system is not a separate process but rather a library call in a library. Another option is to allocate a hardware thread to the operating system.

The operating system performs a ring 0 call via a system call which, in terms of hardware implementation, can be a function call to change a bit, granting permission to change the bit, and identification of the stack from which the OS is operating. In one example implementation, the user can explicitly control the stack, for example by placing the operating system stack in a different register. In another implementation, a system call can change the instruction pointer and the stack.

The message passing infrastructure hardware implementation can, for example, include support for send and receive calls. The hardware implementation can enable faster operating speed. For particular special cases, hardware send and receive calls can be faster than a shared library call. Send and receive are global messages, supporting point-to-point communication in two-party messaging. In some embodiments, the hardware implementation can support put and get APIs to enable sending a message to a designated address asynchronously or synchronously, as selected. The designated address is in a global address space partition, not local load-store. The put and get APIs can handle access to shared physical memory by sending a request to the master or server for the designated memory location. The memory is hashed across all the global memory space. In the illustrative implementation, get and put can be system calls rather than instructions, thus facilitating global access. Because the get and put system calls are relatively resource-expensive, efficiency can be attained by communicating blocks of data, for example 64K, at one time rather than for individual bytes.

For a cache-coherent shared memory that is accessed using the put and get system calls, different schemes can be used depending on what entities are communicating. For entities which share memory, the get and put calls simply access the shared memory. For entities separated by substantial physical or network distances, the get and put calls, if unable to fulfill the call by shared memory access, by running through the same router or similar local actions can send the calls to the network interface to relay remotely, for example across the world. For shared memory, whether cache-coherent or cache-noncoherent, the put and get, and send and receive operations are relatively simple since all entities can access the same memory. More complexity arises when memory is not shared. In various embodiments, when memory is not shared different schemes can be used such as copy-on-write (copying the shared memory), creating in remote memory the shared memory that shares the same capability, an implicit in the put and get, or other options.

The message passing infrastructure thus can include hardware support for the various put and get, send and receive, or the like system calls or instructions. The message passing infrastructure can be configured to enable two threads to be forked and used with the put and get calls to enable optimum speed performance. The send and receive, and put and get instructions, as described, consume two hardware threads or might consume two passive threads.

In some embodiments, the put-get and send-receive can be combined with access bits which designate memory to which the sender is allowed access. Passing along the access bits can enable a reduction in overhead while enabling protection across processes. The overhead of switching or sending a message drops significantly because the receiver already knows the memory to which the sender has access.

Referring to FIGS. 3A through 3H, schematic flow diagrams depict an embodiment or embodiments of a method operable in a computing device adapted for handling security risk which uses taint accumulation to detect intrusion. An embodiment of a method 300, shown in FIG. 3A, can comprise receiving 301 a plurality of taint indicators indicative of potential security risk from a plurality of distinct sources at distinct times, and accumulating 302 the plurality of taint indicators independently using a corresponding plurality of distinct accumulation functions. Security risk can be assessed 303 according to a risk assessment function that is cumulative of the plurality of taint indicators. Note that although, the accumulation functions are distinct and specified independently, nothing prevents selection of identical accumulation functions for multiple taint indicators and such selection is consistent with such distinctness and independence.

Referring to FIG. 3B, a method 305 can be configured wherein receiving 301 the plurality of taint indicators can further comprise receiving 306 the plurality of taint indicators indicative of potential security risk associated with information used by the computing device.

In some embodiments, as shown in FIG. 3C, a method 310 can be implemented wherein accumulating 302 the plurality of taint indicators further comprises accumulating 311 the plurality of taint indicators on a basis selected from a group consisting of per-source, per-data, overall, and combination.

For example, in various embodiments and/or in various conditions, accumulating 311 the plurality of taint indicators can be performed according to one or more selected functions of a plurality of accumulation functions. The accumulation functions can include comparing ones of the accumulated plurality of taint indicators to at least one predetermined threshold, performing power law analysis, performing a race function, performing a counting function, and the like. Suitable counting functions can include counting the number of taints, counting the number of taints per memory unit, counting the number of instructions tainted, counting the number of tainted instructions, counting the number of instructions written as a result of a taint, counting the number of data loads and stores, counting the number of memory accesses, counting the number of calls, counting the number of returns, counting the number of branches, counting the number of integer overflows, counting the number of network input/output events, counting the number of null pointer references, counting the number of buffer overruns/overflows, counting the number of repeated attempts to access a key, and the like.

Referring to FIG. 3D, selected embodiments of a method 315 can further comprise determining 316 whether information from a particular source or entity is trusted based on assessment of security risk.

In various implementations and/or under selected conditions, as shown in FIG. 3E, a method 320 can further comprise the computing device operating 321 in a federated system comprising a least a first entity and a second entity, and tracking 322 at least one of the plurality of taint indicators of the first entity against at least one of the plurality of taint indicators of the second entity.

Referring to FIG. 3F, some embodiments of a method 325 can further comprise accumulating 326 the plurality of taint indicators comprising counting taint indicators affiliated with a plurality of entities per affiliation, and merging 327 a low level for a plurality of affiliations up to a higher level.

A number of embodiments or implementations of a method 330 can be applied in a federated system. An illustrative method 330, illustrated in FIG. 3G, can comprise defining 331 a plurality of pathways through a federated system, tracking 332 sources of information through the federated system, and passing 333 information of a specified pathway of the plurality of pathways through a validator.

Several embodiments and/or operating conditions can call for intrusion handling using a trust profile. Referring to FIG. 3H, a method 335 can comprise forming 336 a trust profile using the accumulated plurality of taint indicators, and dynamically raising and lowering 337 trust level of the trust profile based on the accumulated plurality of taint indicators. The method 335 can further comprise responding 338 to security risk in response to the trust level.

Figure 4C:
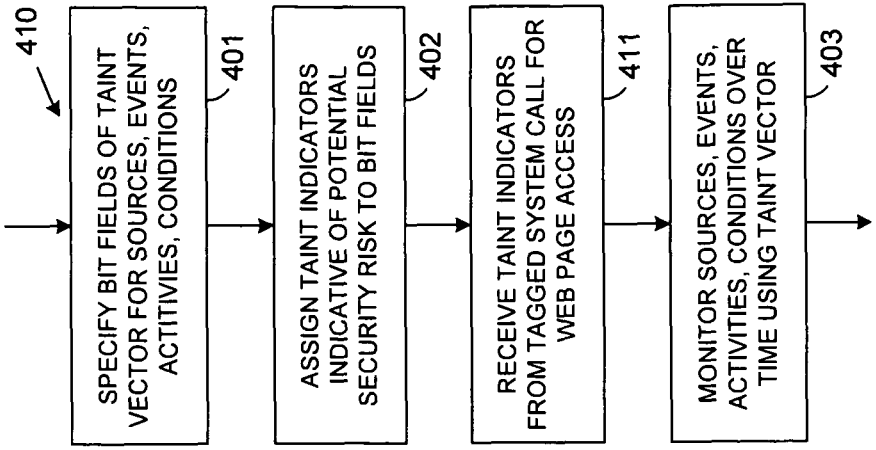
FIGS. 4A through 4O are schematic flow diagrams depicting an embodiment or embodiments of a method operable in a computing device implementing security using taint vectors which are specified and monitored to detect and possibly respond to security risk.
Figure 4B:
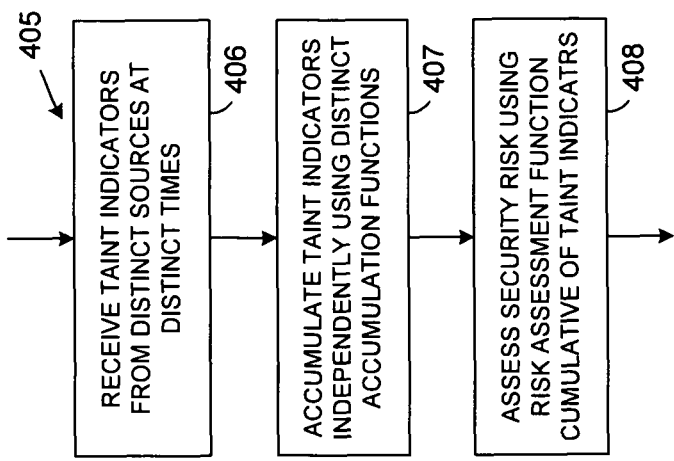
Figure 4A:
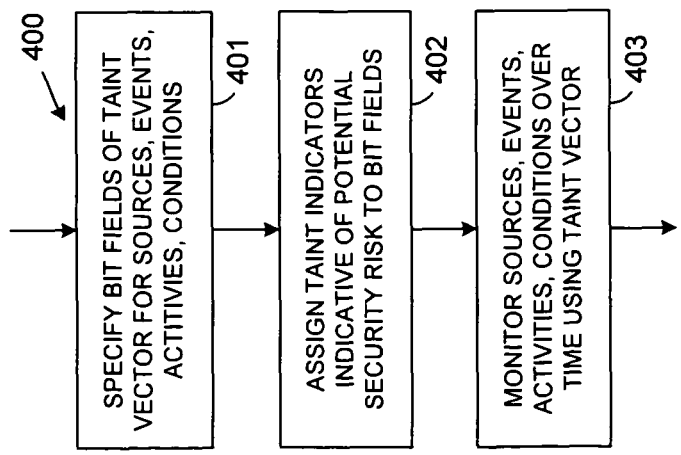
Figure 4O:
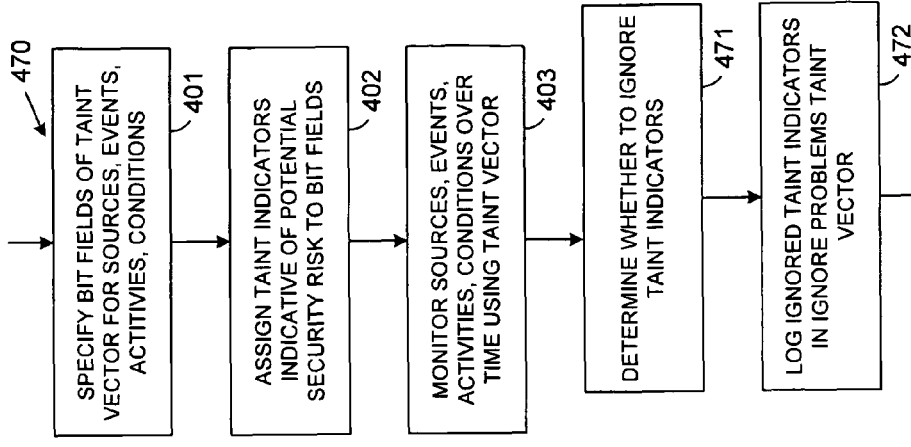

Referring to FIGS. 4A through 4O, schematic flow diagrams depict an embodiment or embodiments of a method operable in a computing device implementing security using taint vectors which are specified and monitored to detect and possibly respond to security risk. Referring to FIG. 4A, an embodiment of a method 400 operable in a computing device for handling security risk can comprise specifying 401 a plurality of bit fields of a taint vector corresponding to plurality of sources, events, activities, and/or conditions, and assigning 402 a plurality of taint indicators indicative of potential security risk to the bit fields of the taint vector. The plurality of sources, events, activities, and/or conditions can be monitored 403 over time using the taint vector.

Monitoring 403 the plurality of sources, events, activities, and/or conditions can comprise monitoring potentially at least one innocent and/or coincidental event from events including null pointer references, attempts to secure part of a processor, innocent and/or coincidental events arising from a region that raises suspicion, and similar events.

Referring to FIG. 4B, a method 405 can further comprise receiving 406 the plurality of taint indicators from a plurality of distinct sources at distinct times, and accumulating 407 the plurality of taint indicators in the bit fields of the taint vector independently using a corresponding plurality of distinct accumulation functions. Security risk can be assessed 408 according to a risk assessment function that is cumulative of the plurality of taint indicators.

In various embodiments and/or conditions, security risk can be assessed 408 via one or more actions selected from actions such as determining whether any elements are greater than a predetermined threshold, determining whether all elements are greater than a predetermined threshold, determining whether the sum of some elements is greater than a predetermined threshold, determining whether the sum of all elements is greater than a predetermined threshold, and the other similar suitable actions.

Referring to FIG. 4C, a method 410 for handling security risk can further comprise receiving 411 taint indicators from a tagged system call associated with accessing information from a web page wherein an operating system injects a label indicating originating from a browser at an identified site.

Some embodiments and/or applications of a method 415 can apply decay to accumulation of the taint vector. For example, the method 415, as illustrated in FIG. 4D, can comprise specifying 416 a plurality of decay options corresponding to the plurality of taint indicators according to information type, and applying 417 the decay options to the bit fields of the taint vector.

In various embodiments and/or conditions, one or more decay options can be selected from a plurality of decay options such as applying decay after a predetermined number of operations to avoid triggering on outlying events, setting decay to account for rare and spurious events with a probability of occurrence by chance during long term monitoring, incrementing/decrementing using a single vector, and subtracting a predetermined number. Additional decay options can include shifting a taint vector in an interval of time, shifting a taint vector at a predetermined instruction count, shifting a taint vector at a predetermined processor cycle count, copying a taint vector periodically to memory to maintain an old version while incrementing/decrementing to enable restoration following an invalid or error condition, imposing decay that balances accumulation, applying decay periodically, applying decay with a varying period that varies based on a sensitivity meter, applying decay with a varying period that varies based on environment, applying decay with a varying period that varies based on activity type, applying decay according to a programmable parameter at a programmable rate, and the like.

Referring to FIG. 4E, a method 420 for handling security risk can further comprise tracking 421 taint indicators characterized by a range of taintedness from potentially suspicious to definite taints.

A method 425 can also respond to security risk, as shown in FIG. 4F. The method 425 can further comprise detecting 426 at least one security risk event as a result of monitoring the plurality of sources, events, activities, and/or conditions, and responding 427 to security risk in response to determination of the at least one security risk event.

In various embodiments and/or conditions, responding 427 to security risk in response to detection 426 of the at least one security risk event can be one or more responses selected from a group of responses that range from relatively minor informational actions to actions which can moderately or substantially change system operations, or even terminate some or all system operations. Minor or informational responses can include including ignoring the at least one security risk event, logging the at least one security risk event, displaying a notification, displaying a warning message, generating an alarm, and the like. Responses affecting system operations can include preventing a memory and/or register write, modifying operating frequency, modifying operating voltage, modifying another operating parameter, performing a system call, and others. More drastic responses that can moderately or substantially affect operations can include calling a trap and/or exception, terminating operation of selected resources, activating a system shutdown, and the like.

In various embodiments of a method 430 for handling security risk, for example as shown in FIG. 4G, specifying 401 a plurality of bit fields of a taint vector corresponding to plurality of sources, events, activities, and/or conditions can include one or more actions such as configuring 431 the bit fields of the taint vector to include primary and secondary criteria corresponding to selected taint indicators and to include information and/or identifiers relating to actions, consequences, and usage. Another action that can be selected is configuring 432 the bit fields of the taint vector to set a hierarchy of suspicion based on source, type, and/or identity of an event. Another possible action can be configuring 433 the bit fields of the taint vector to include tolerances based on questionability of a source and/or event. Also, the bit fields of the taint vector can be configured 434 at a selected granularity including a taint bit per entry, a taint bit per register, a taint bit per multiple entries, a taint vector per entry, a taint vector per register, and a taint vector allocating multiple entries. Other similar actions may be suitable and can also be selected.

Taints can be allocated to a taint vector in any suitable manner. For example, taints can be allocated at a selected granularity selected from allocations including allocating taints by memory page, allocating taints by byte, allocating taints by word, allocating taints by memory block, allocating taints by hardware process identifier (PID), and allocating taints to enable a cross-thread taint. Additional allocations can include allocating taints among hardware devices, allocating taints by component, allocating taints by software component, and the like.

A method can be implemented to construct and use a memory taint hash table which, if read-only, can indicate a level of taint per memory block. A read-only memory prevents logging of taints in memory so that the table can be located outside of the read-only memory. The amount of memory used for the table can be reduced by using a hash. Memory at the hash of an address can be used to compress the address. Accordingly, referring to FIG. 4H, a method 435 for handling security risk can further comprise forming 436 a memory taint hash table, and using 437 the memory taint hash table to indicate a level of taint per memory block.

Similarly, referring to FIG. 4I, a method 440 for handling security risk can comprise accessing 441 a memory taint hash table, and indicating 442 a level of taint per memory block using the memory taint hash table.

Referring to FIG. 4J, a method 445 for handling security risk can comprise configuring 446 a taint vector in a selected manner. Suitable manners can include configuring 447 a taint vector to segregate memory by type, configuring 448 a taint vector to segregate memory by type at a selected granularity, configuring 449 a taint vector to segregate memory between program code memory and data memory. Other similar suitable manners for configuring a taint vector can be implemented.

In some embodiments, as shown FIG. 4K, a method 450 for handling security risk can further comprise tracking 451 taints using hardware devices, and inserting 452 initial taint notifications using software components.

In various embodiments, referring to FIG. 4L, a method 455 for handling security risk can further comprise dynamically adjusting 456 rate and period of updating the taint vector using a taint adjustment vector comprising at least one parameter.

Figure 4N:
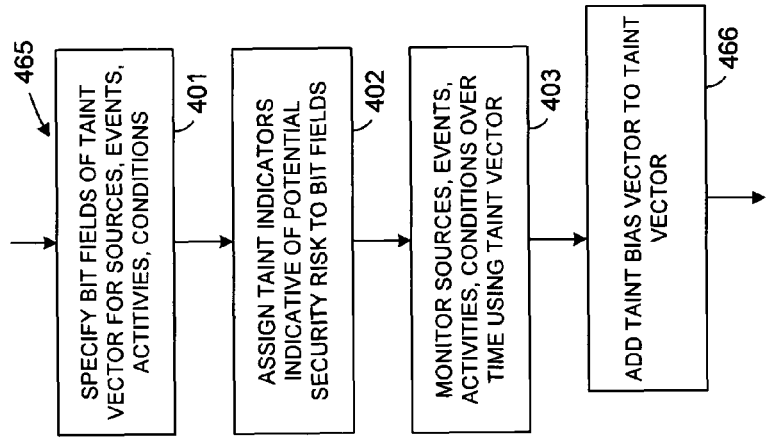
Figure 4M:
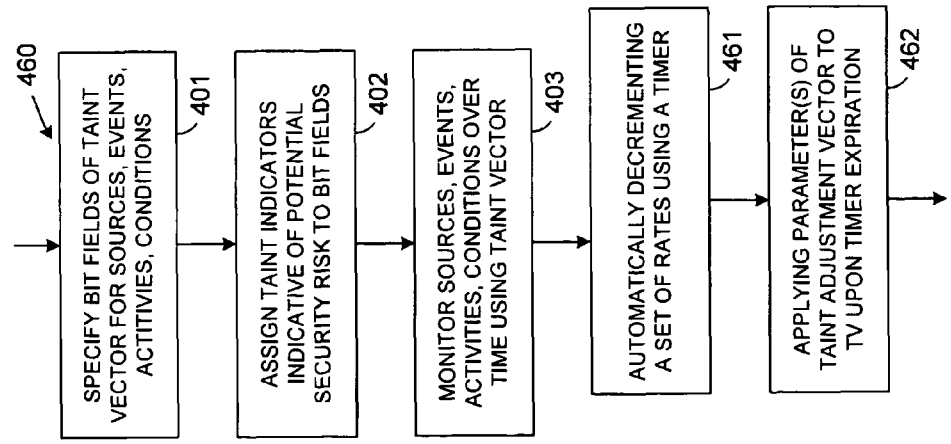

In some example embodiments, as depicted in FIG. 4M, a method 460 for handling security risk can further comprise automatically decrementing 461 a set of rates using at least one timer, and applying 462 at least one parameter of the taint adjustment vector to the taint vector upon expiration of the at least one timer.

In some embodiments, as illustrated in FIG. 4N, a method 465 for handling security risk can further comprise recursively adding 466 a taint bias vector to the taint vector.

In several embodiments, shown in FIG. 4O, a method 470 for handling security risk can further comprise determining 471 whether to ignore one or more taint indicators, and logging 472 occurrences of the ignored one or more taint indicators in a ignore problems taint vector.

Figure 5:
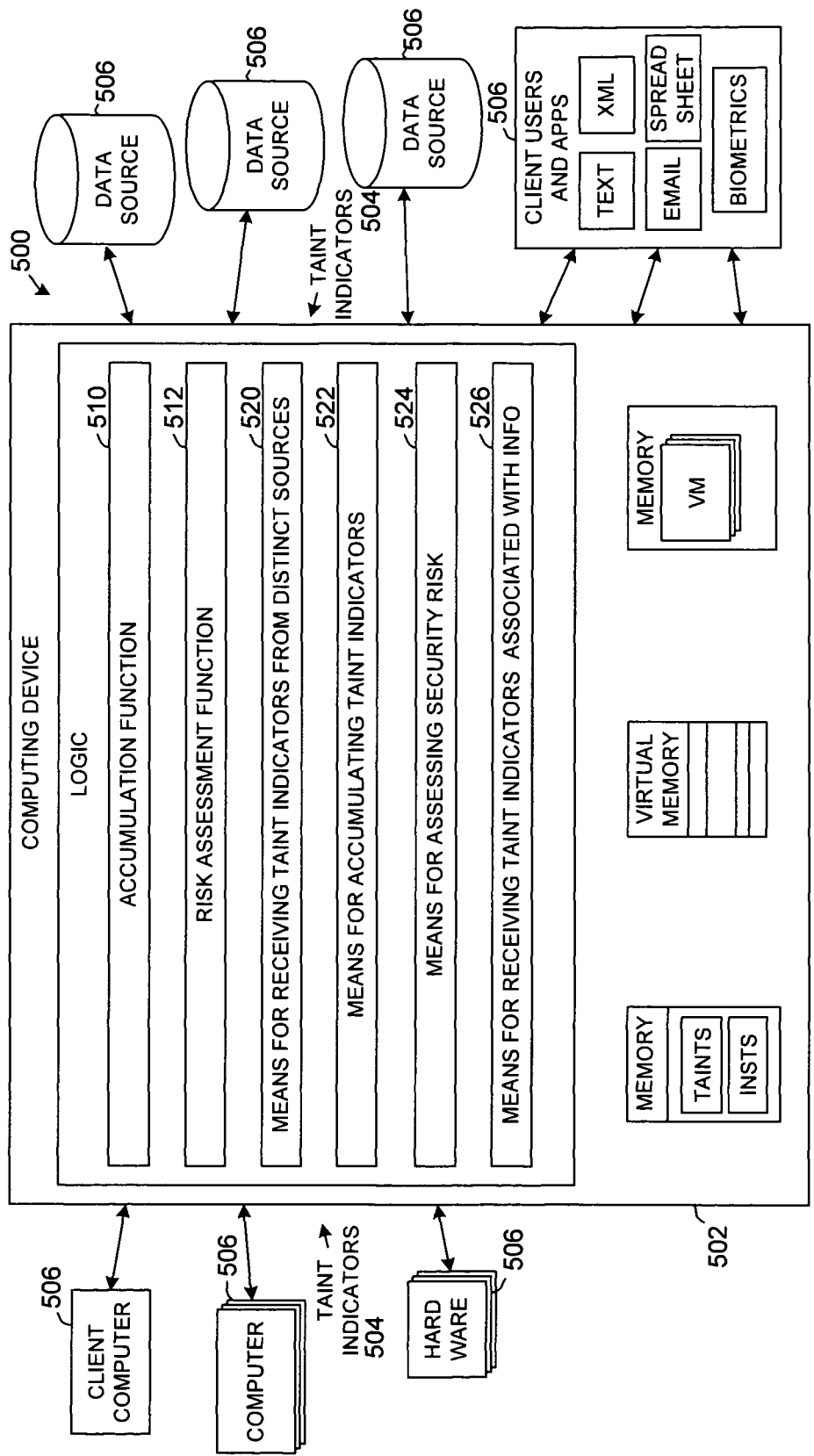
FIG. 5 is a schematic block diagram illustrating an embodiment of a computing system which is operable to handle security risk via intrusion detection using accumulation of taint indicators.

Referring to FIG. 5, a schematic block diagram illustrates an embodiment of a computing system 500 which is operable to handle security risk via intrusion detection using accumulation of taint indicators. The illustrative computing system 500 can comprise means 520 for receiving a plurality of taint indicators 504 indicative of potential security risk from a plurality of distinct sources 506 at distinct times, means 522 for accumulating the plurality of taint indicators 504 independently using a corresponding plurality of distinct accumulation functions 510, and means 524 for assessing security risk according to a risk assessment function 512 that is cumulative of the plurality of taint indicators 504.

In some embodiments, the computing system 500 can further comprise means 526 for receiving the plurality of taint indicators 504 indicative of potential security risk associated with information used by a computing device 502.

Figure 6:
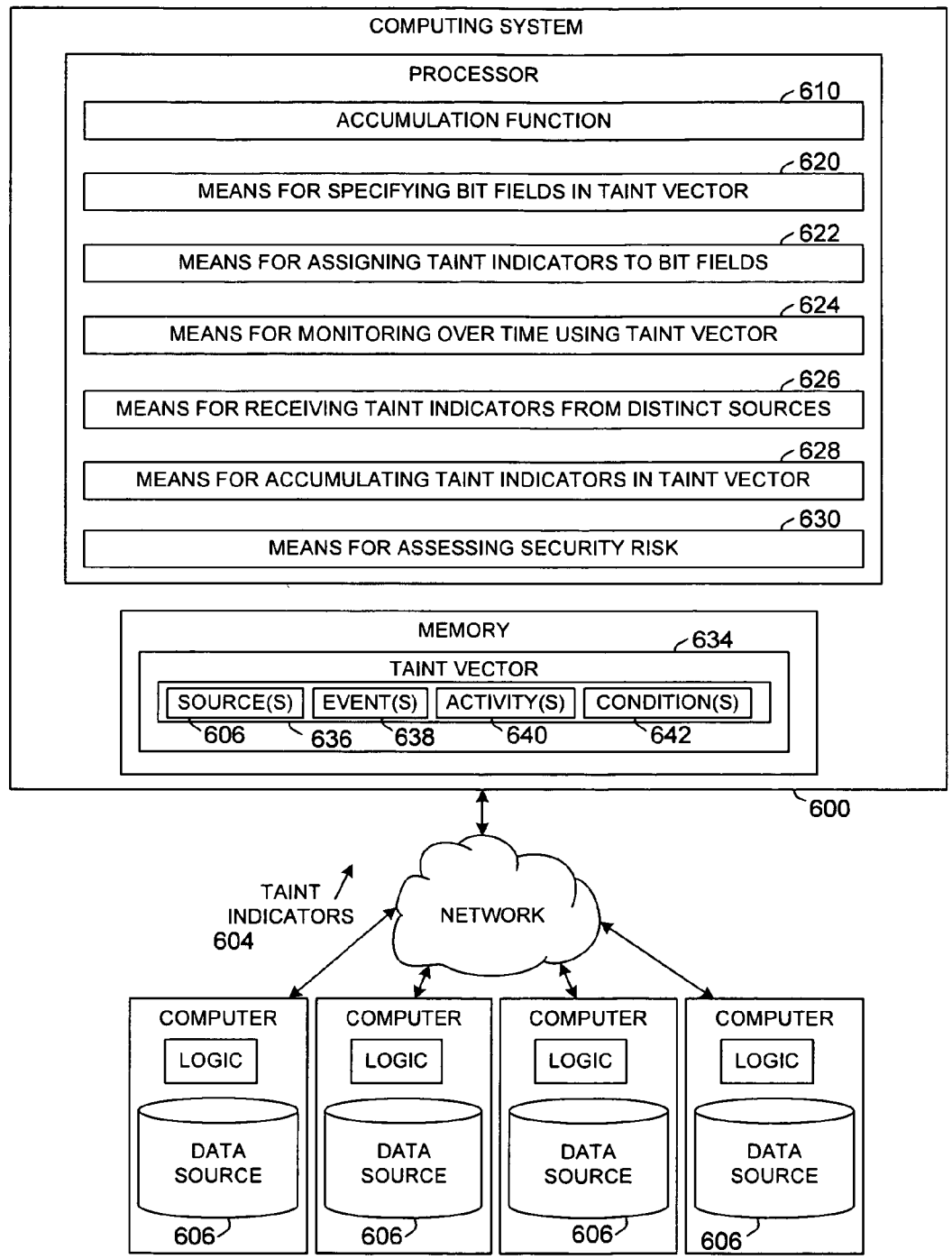
FIG. 6 is a schematic block diagram showing an embodiment of a computing system which is operable to handle security risk via intrusion detection using tracking via taint vector.

Referring to FIG. 6, a schematic block diagram illustrates an embodiment of a computing system 600 which is operable to handle security risk via intrusion detection using tracking via taint vector 634. The illustrative computing system 600 can comprise means 620 for specifying a plurality of bit fields 636 of a taint vector 634 corresponding to plurality of sources 606, events 638, activities 640, and/or conditions 642. The computing system 600 can further comprise means 622 for assigning a plurality of taint indicators 604 indicative of potential security risk to the bit fields 636 of the taint vector 634, and means 624 for monitoring the plurality of sources 606, events 638, activities 640, and/or conditions 642 over time using the taint vector 634.

In some embodiments, the computing system 600 can further comprise means 626 for receiving the plurality of taint indicators 604 from a plurality of distinct sources 606 at distinct times, and means 628 for accumulating the plurality of taint indicators 604 in the bit fields 636 of the taint vector 634 independently using a corresponding plurality of distinct accumulation functions 610. The computing system 600 can further comprise means 630 for assessing security risk according to a risk assessment function that is cumulative of the plurality of taint indicators 604.

Terms "substantially", "essentially", or "approximately", that may be used herein, relate to an industry-accepted variability to the corresponding term. Such an industry-accepted variability ranges from less than one percent to twenty percent and corresponds to, but is not limited to, materials, shapes, sizes, functionality, values, process variations, and the like. The term "coupled", as may be used herein, includes direct coupling and indirect coupling via another component or element where, for indirect coupling, the intervening component or element does not modify the operation. Inferred coupling, for example where one element is coupled to another element by inference, includes direct and indirect coupling between two elements in the same manner as "coupled".

The illustrative pictorial diagrams depict structures and process actions in a manufacturing process. Although the particular examples illustrate specific structures and process acts, many alternative implementations are possible and commonly made by simple design choice. Manufacturing actions may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, shapes, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

The invention claimed is:

1. A method operable in one or more processing devices for handling security risk comprising:

receiving at least one of an incoming instruction or data from one or more sources; and executing one or more instructions on the one or more processing devices to perform one or more operations including at least:

detecting one or more potential taint indicators indicative of activities or events occurring during execution associated with the at least one of the incoming instruction or data received from the one or more sources, the activities or events occurring during the execution of the instructions including at least one of a null pointer reference, an integer overflow, a buffer overflow, one or more attempts to access a memory element according to a predetermined restriction, or one or more attempts to access processor element according to a predetermined restriction;

assigning at least one of the one or more potential taint indicators to at least one taint vector including vector fields operated upon by the one or more instructions, the vector fields including at least one taint indicator field associated with the one or more potential taint indicators, at least one source field associated with the one or more sources, and at least one accumulator field corresponding to the at least one taint indicator field and the at least one source field;

accumulating, in response to the receipt of the data from one or more sources, one or more taints in the at least one accumulator field of the at least one taint vector corresponding to the at least one taint indicator field according to one or more taint accumulation functions based at least in part on the one or more potential taint indicators and the associated one or more sources; and assessing security risk based at least partially on the accumulation in the at least one accumulator field of the at least one taint vector according to a risk assessment function that is cumulative of the one or more taints and assesses whether at least one of the one or more cumulative taints is indicative of potential security risk for the one or more potential taint indicators and the associated one or more sources, wherein at least one of the receiving, the detecting, the assigning, the accumulating, or the assessing is at least partially implemented using the one or more processing devices.

2. A method operable in one or more processing devices for handling security risk comprising:

detecting one or more potential taint indicators indicative of activities or events occurring during execution of instructions associated with the at least one of an incoming instructions or data received from the one or more sources, the activities or events occurring during execution including at least one of a null pointer reference, an integer overflow, a buffer overflow, one or more attempts to access a memory element according to a predetermined restriction, or one or more attempts to access processor element according to a predetermined restriction;

specifying three or more bit fields of at least one taint vector including three or more vector fields operated upon by the one or more instructions, the three or more vector fields including at least one taint indicator field associated with the one or more potential taint indicators, at least one source field associated with the one or more sources, and at least one accumulator field of the at least one taint vector corresponding to the at least one taint indicator field and the at least one source field; and executing the one or more instructions on the one or more processing devices including at least:

accumulating one or more taints in the at least one accumulator field of the at least one taint vector corresponding to the at least one taint indicator field according to one or more taint accumulation functions based at least in part on the one or more potential taint indicators and the associated one or more sources; and responding to at least one taint indicative of potential security risk to one or more resources based at least partially on the accumulation in the at least one accumulator field of the at least one taint vector of the one or more taints according to the one or more taint accumulation functions.

3. A computing system comprising:

at least one interface configured at least partially in hardware to receive at least one of an incoming instruction or data from one or more sources; and one or more processors configured to execute one or more instructions on one or more processing devices to perform one or more operations including at least:

detecting one or more potential taint indicators indicative of activities or events occurring during execution associated with the at least one of the incoming instruction or data received from the one or more sources, the activities or events occurring during the execution of the instructions including at least one of a null pointer reference, an integer overflow, a buffer overflow, one or more attempts to access a memory element according to a predetermined restriction, or one or more attempts to access processor element according to a predetermined restriction;

assigning at least one of the one or more potential taint indicators to at least one taint vector including vector fields operated upon by the one or more instructions, the vector fields including at least one taint indicator field associated with the one or more potential taint indicators, at least one source field associated with the one or more sources, and at least one accumulator field of the at least one taint vector corresponding to the at least one taint indicator field and the at least one source field;

accumulating, in response to the receipt of the data from one or more sources, one or more taints in the at least one accumulator field of the at least one taint vector corresponding to the at least one taint indicator field according to one or more taint accumulation functions based at least in part on the one or more potential taint indicators and the associated one or more sources; and assessing security risk based at least partially on the accumulation in the at least one accumulator field of the at least one taint vector according to a risk assessment function that is cumulative of the one or more taints and assesses whether at least one of the one or more cumulative taints is indicative of potential security risk to one or more resources for the one or more potential taint indicators and the associated one or more sources.

4. The computing system according to claim 3 wherein the one or more resources include:

at least one of networks, systems, processors, central processing units (CPUs), graphics hardware, network controllers, memory, memory management, hardware, software systems, virtual entities, power, operating cycles, libraries, operating systems, pools of resources, or combinations of resources.

5. The computing system according to claim 3 wherein the at least one interface configured at least partially in hardware to receive at least one of the incoming instruction or data from one or more sources comprises:

at least one network interface configured to receive at least one of the incoming instruction or data forwarded from a network source.

6. The computing system according to claim 3 wherein the detecting one or more potential taint indicators indicative of activities or events occurring during execution of instructions associated with the at least one of the incoming instruction or data received from the one or more sources comprises:

receiving a signal from processor hardware indicating at least one of a null pointer reference, a buffer overrun, a buffer overflow, an integer overflow, or a fault.

7. The computing system according to claim 3 wherein the detecting one or more potential taint indicators indicative of activities or events occurring during execution of instructions associated with the at least one of the incoming instruction or data received from the one or more sources comprises:

detecting execution of at least one instruction indicative of at least one of a virus attempt to call home or an attacker attempting to compromise a web browser.

8. The computing system according to claim 3 wherein the detecting one or more potential taint indicators indicative of activities or events occurring during execution of instructions associated with the at least one of the incoming instruction or data received from the one or more sources comprises:

receiving a signal from at least one trusted platform module (TPM) interface indicating at least one of repeated attempts to access a key, an attempt to access a secured part of a processor, an attempt to access a secured resource, an event originating in a region that raises suspicion, a taint indicated by power law analysis, or a taint indicated by a race function.

9. The computing system according to claim 3 wherein the detecting one or more potential taint indicators indicative of activities or events occurring during execution of instructions associated with the at least one of the incoming instruction or data received from the one or more sources comprises:

receiving a signal from at least one hardware interface indicating at least one attempt to access a secure part of the one or more processing devices.

10. The computing system according to claim 3 wherein the detecting one or more potential taint indicators indicative of activities or events occurring during execution of instructions associated with the at least one of the incoming instruction or data received from the one or more sources comprises:

receiving a signal from at least one operating system interface indicating at least one system call associated with reading data from one or more web pages.

11. The computing system according to claim 3 wherein the detecting one or more potential taint indicators indicative of activities or events occurring during execution of instructions associated with the at least one of the incoming instruction or data received from the one or more sources comprises:

receiving a signal from at least one operating system interface indicating that the information from the one or more web pages originated from a web browser at an identified web site.

12. The computing system according to claim 3 wherein the at least one taint vector including two or more vector fields operated upon by one or more instructions comprises:

at least one taint vector including at least one of one or more event taint indicator fields indicative of one or more risk events, one or more activity taint indicator fields indicative of one or more risk activities, or one or more condition taint indicator fields indicative of one or more risk conditions associated with the one or more sources in the at least one source field.

13. The computing system according to claim 3 wherein the at least one taint vector including vector fields operated upon by one or more instructions comprises:

at least one composite taint vector including two or more resource fields associated with respective two or more resources, the two or more resource fields including at least one source field associated with the at least one indicator of the at least one of the one or more sources and at least one taint indicator field associated with the one or more taint indicators.

14. The computing system according to claim 3 wherein the accumulating, in response to the receipt of the data from one or more sources, one or more taints in the at least one accumulator field of the at least one taint vector corresponding to the at least one taint indicator field according to one or more taint accumulation functions based at least in part on the one or more potential taint indicators and the associated one or more sources comprises:

accumulating, in response to the receipt of the data from one or more sources, one or more taints according to a taint accumulation function on at least one of a per-location, per-data, or overall basis to quantify whether data from a predetermined source or entity is indicative of potential security risk.

15. The computing system according to claim 3 wherein the accumulating, in response to the receipt of the data from one or more sources, one or more taints in the at least one accumulator field of the at least one taint vector corresponding to the at least one taint indicator field according to one or more taint accumulation functions based at least in part on the one or more potential taint indicators and the associated one or more sources comprises:

accumulating, in response to the receipt of the data from one or more sources, one or more taints according to a taint accumulation function configured to compare accumulated taints to a predetermined threshold.

16. The computing system according to claim 3 wherein the accumulating, in response to the receipt of the data from one or more sources, one or more taints in the at least one accumulator field of the at least one taint vector corresponding to the at least one taint indicator field according to one or more taint accumulation functions based at least in part on the one or more potential taint indicators and the associated one or more sources comprises:

accumulating, in response to the receipt of the data from one or more sources, one or more taints according to a taint accumulation function configured to accumulate first taints from a first source to determine first taints indicative of potential security risk and accumulate second taints from a second source to determine second taints indicative of potential security risk, and respond to the first taints indicative of potential security risk and the second taints indicative of potential security risk at distinctive times and with distinctive responses.

17. The computing system according to claim 3 wherein the accumulating, in response to the receipt of the data from one or more sources, one or more taints in the at least one accumulator field of the at least one taint vector corresponding to the at least one taint indicator field according to one or more taint accumulation functions based at least in part on the one or more potential taint indicators and the associated one or more sources comprises:

accumulating, in response to the receipt of the data from one or more sources, one or more taints according to a taint accumulation function configured to accumulate first taints in association with first data from a first source to determine first taints indicative of potential security risk based at least in part on the first data and the first source and accumulate second taints in association with second data from a second source to determine second taints indicative of potential security risk based at least in part on the second data and the second source.

18. The computing system according to claim 3 wherein the accumulating, in response to the receipt of the data from one or more sources, one or more taints in the at least one accumulator field of the at least one taint vector corresponding to the at least one taint indicator field according to one or more taint accumulation functions based at least in part on the one or more potential taint indicators and the associated one or more sources comprises:

accumulating, in response to the receipt of the data from one or more sources, one or more taints according to a taint accumulation function configured to accumulate taints in association with data from a source to determine taints indicative of potential security risk based at least in part on the data and the source.

19. The computing system according to claim 3 wherein the accumulating, in response to the receipt of the data from one or more sources, one or more taints in the at least one accumulator field of the at least one taint vector corresponding to the at least one taint indicator field according to one or more taint accumulation functions based at least in part on the one or more potential taint indicators and the associated one or more sources comprises:
  accumulating, in response to the receipt of the data from one or more sources, one or more taints according to a taint accumulation function configured to accumulate taints including at least one of counting a number of taints, counting a number of taints per memory unit, counting a number of instructions tainted, counting a number of tainted instructions, counting a number of instructions written as a result of at least one taint, counting a number of loads or stores associated with at least one taint, counting a number of memory accesses, counting a number of outputs, counting a number of calls, counting a number of returns, counting a number of branches, counting a number of integer overflows, or counting a number of network input/output events.

20. The computing system according to claim 3 wherein the accumulating, in response to the receipt of the data from one or more sources, one or more taints in the at least one accumulator field of the at least one taint vector corresponding to the at least one taint indicator field according to one or more taint accumulation functions based at least in part on the one or more potential taint indicators and the associated one or more sources comprises:
  accumulating, in response to the receipt of the data from one or more sources, one or more taints according to a taint accumulation function configured to accumulate taints in association with at least one composite taint vector including two or more resource fields associated with respective two or more resources, the taint accumulation function configured to monitor and track taints for multiple of at least one of resources, conditions, events, or activities concurrently.

21. The computing system according to claim 3 wherein the accumulating, in response to the receipt of the data from one or more sources, one or more taints in the at least one accumulator field of the at least one taint vector corresponding to the at least one taint indicator field according to one or more taint accumulation functions based at least in part on the one or more potential taint indicators and the associated one or more sources comprises:
  accumulating, in response to the receipt of the data from one or more sources, one or more taints according to a taint accumulation function configured to accumulate taints over time and offset the accumulated taints with a predetermined decay function.

22. The computing system according to claim 3 wherein the accumulating, in response to the receipt of the data from one or more sources, one or more taints in the at least one accumulator field of the at least one taint vector corresponding to the at least one taint indicator field according to one or more taint accumulation functions based at least in part on the one or more potential taint indicators and the associated one or more sources comprises:
  accumulating, in response to the receipt of the data from one or more sources, one or more taints according to a taint accumulation function configured to accumulate taints over time and offset the accumulated taints with a predetermined decay function, the predetermined decay function including at least one of (1) incrementing a taint accumulation, (2) decrementing a taint accumulation, (3) adding a predetermined number to a taint accumulation, (4) subtracting a predetermined number to a taint accumulation, (5) copying at least one taint accumulation to memory periodically to maintain a legacy condition while continuously incrementing and decrementing to enable restoration of the legacy condition in response to an invalid or error condition, (6) imposing a decay that is a race of decay versus accumulation, or (7) shifting a taint accumulation a predetermined number of bits.

23. The computing system according to claim 3 wherein the accumulating, in response to the receipt of the data from one or more sources, one or more taints in the at least one accumulator field of the at least one taint vector corresponding to the at least one taint indicator field according to one or more taint accumulation functions based at least in part on the one or more potential taint indicators and the associated one or more sources comprises:
  accumulating, in response to the receipt of the data from one or more sources, one or more taints according to a taint accumulation function configured to accumulate taints over time and offset the accumulated taints with a predetermined decay function configured to decay the accumulated taints periodically with a period that varies according to a sensitivity meter wherein a rate of decay is based at least in part on environment of a system.

24. The computing system according to claim 3 wherein the accumulating, in response to the receipt of the data from one or more sources, one or more taints in the at least one accumulator field of the at least one taint vector corresponding to the at least one taint indicator field according to one or more taint accumulation functions based at least in part on the one or more potential taint indicators and the associated one or more sources comprises:
  accumulating, in response to the receipt of the data from one or more sources, one or more taints according to a taint accumulation function configured to accumulate taints over time and offset the accumulated taints with a predetermined decay function configured to update the accumulated taints according to a decay predetermined in association with at least one of a decay time interval, a decay instruction count, a decay time period, a decay processor frequency, or a decay processor cycle count.

25. The computing system according to claim 3 wherein the accumulating, in response to the receipt of the data from one or more sources, one or more taints in the at least one accumulator field of the at least one taint vector corresponding to the at least one taint indicator field according to one or more taint accumulation functions based at least in part on the one or more potential taint indicators and the associated one or more sources comprises:
  accumulating, in response to the receipt of the data from one or more sources, one or more taints according to a taint accumulation function configured to accumulate taints over time and offset the accumulated taints with a predetermined decay function configured to decay the accumulated taints periodically with a period that varies according to a sensitivity meter responsive to an instruction configured to operate in conjunction with an operating system to read a register indicating a protection level and set a decay rate based at least in part on the protection level.

26. The computing system according to claim 3 wherein the accumulating, in response to the receipt of the data from one or more sources, one or more taints in the at least one accumulator field of the at least one taint vector corresponding to the at least one taint indicator field according to one or more taint accumulation functions based at least in part on the one or more potential taint indicators and the associated one or more sources comprises:
  accumulating, in response to the receipt of the data from one or more sources, one or more taints according to a taint accumulation function configured to operate in combination with at least one taint adjustment vector to dynamically adjust the at least one taint vector periodically.

27. The computing system according to claim 3 wherein the accumulating, in response to the receipt of the data from one or more sources, one or more taints in the at least one accumulator field of the at least one taint vector corresponding to the at least one taint indicator field according to one or more taint accumulation functions based at least in part on the one or more potential taint indicators and the associated one or more sources comprises:
  accumulating, in response to the receipt of the data from one or more sources, one or more taints according to a taint accumulation function configured to operate in combination with at least one taint adjustment vector responsive to an instruction configured to operate in conjunction with an operating system to control a set of taint adjustment parameter vectors configured to adjust the at least one taint vector.

28. The computing system according to claim 3 wherein the accumulating, in response to the receipt of the data from one or more sources, one or more taints in the at least one accumulator field of the at least one taint vector corresponding to the at least one taint indicator field according to one or more taint accumulation functions based at least in part on the one or more potential taint indicators and the associated one or more sources comprises:
  accumulating, in response to the receipt of the data from one or more sources, one or more taints according to a taint accumulation function configured for dynamic modification by application of at least one taint bias vector.

29. The computing system according to claim 3 wherein the assessing security risk based at least partially on the accumulation in the at least one accumulator field of the at least one taint vector according to a risk assessment function that is cumulative of the one or more taints and assesses whether at least one of the one or more cumulative taints is indicative of potential security risk to one or more resources for the one or more potential taint indicators and the associated one or more sources comprises:
  assessing security risk of at least one of a plurality of taints indicative of potential security risk including setting an indicator of a possibility of potential security risk.

30. The computing system according to claim 3 wherein the assessing security risk based at least partially on the accumulation in the at least one accumulator field of the at least one taint vector according to a risk assessment function that is cumulative of the one or more taints and assesses whether at least one of the one or more cumulative taints is indicative of potential security risk to one or more resources for the one or more potential taint indicators and the associated one or more sources comprises:
  assessing security risk of at least one of a plurality of taints indicative of potential security risk including assessing a response of trapping to software.

31. The computing system according to claim 3 wherein the assessing security risk based at least partially on the accumulation in the at least one accumulator field of the at least one taint vector according to a risk assessment function that is cumulative of the one or more taints and assesses whether at least one of the one or more cumulative taints is indicative of potential security risk to one or more resources for the one or more potential taint indicators and the associated one or more sources comprises:
  assessing security risk of at least one of a plurality of taints indicative of potential security risk including assessing a response of blocking input/output operations.

32. The computing system according to claim 3 wherein the assessing security risk based at least partially on the accumulation in the at least one accumulator field of the at least one taint vector according to a risk assessment function that is cumulative of the one or more taints and assesses whether at least one of the one or more cumulative taints is indicative of potential security risk to one or more resources for the one or more potential taint indicators and the associated one or more sources comprises:
  assessing security risk of at least one of a plurality of taints indicative of potential security risk determined by at least one thresholding operation including at least one of (1) a number of the plurality of taints indicative of potential security risk greater than a predetermined threshold, (2) any of the plurality of taints indicative of potential security risk greater than a predetermined threshold, (3) all of the plurality of taints indicative of potential security risk greater than a predetermined threshold, (4) a sum of the plurality of taints indicative of potential security risk greater than a predetermined threshold, or (5) a sum of the plurality of taints indicative of potential security risk greater than a predetermined intermediate value.

33. The computing system according to claim 3 wherein the assessing security risk based at least partially on the accumulation in the at least one accumulator field of the at least one taint vector according to a risk assessment function that is cumulative of the one or more taints and assesses whether at least one of the one or more cumulative taints is indicative of potential security risk to one or more resources for the one or more potential taint indicators and the associated one or more sources comprises:
  assessing security risk of at least one of a plurality of taints indicative of potential security risk including at least determining a response based at least in part on a tolerance set based at least in part on one or more of the at least one indicator of the at least one of the one or more sources and the one or more taint indicators.

34. The computing system according to claim 3 wherein the assessing security risk based at least partially on the accumulation in the at least one accumulator field of the at least one taint vector according to a risk assessment function that is cumulative of the one or more taints and assesses whether at least one of the one or more cumulative taints is indicative of potential security risk to one or more resources for the one or more potential taint indicators and the associated one or more sources comprises:
  assessing security risk of at least one of a plurality of taints indicative of potential security risk, wherein assessing a response includes at least one of a trap, an exception, a notification, or an alarm.

35. The computing system according to claim 3 wherein the assessing security risk based at least partially on the accumulation in the at least one accumulator field of the at least one taint vector according to a risk assessment function that is cumulative of the one or more taints and assesses whether at least one of the one or more cumulative taints is indicative of potential security risk to one or more resources for the one or more potential taint indicators and the associated one or more sources comprises:

assessing security risk of at least one of a plurality of taints indicative of potential security risk based at least in part on a hint instruction configured to operate in conjunction with an operating system to indicate at least one taint condition that is not indicative of potential security risk.

36. The computing system according to claim 3 wherein the assessing security risk based at least partially on the accumulation in the at least one accumulator field of the at least one taint vector according to a risk assessment function that is cumulative of the one or more taints and assesses whether at least one of the one or more cumulative taints is indicative of potential security risk to one or more resources for the one or more potential taint indicators and the associated one or more sources comprises:

assessing security risk of at least one of a plurality of taints indicative of potential security risk including incrementing an ignore problems taint vector based at least in part on a hint instruction configured to operate in conjunction with an operating system.

37. The computing system according to claim 3 wherein the assessing security risk based at least partially on the accumulation in the at least one accumulator field of the at least one taint vector according to a risk assessment function that is cumulative of the one or more taints and assesses whether at least one of the one or more cumulative taints is indicative of potential security risk to one or more resources for the one or more potential taint indicators and the associated one or more sources comprises:

associating at least one of a plurality of taints indicative of potential security risk with a complex system including multiple resources assigned in a single taint vector.

38. The computing system according to claim 3 wherein the assessing security risk based at least partially on the accumulation in the at least one accumulator field of the at least one taint vector according to a risk assessment function that is cumulative of the one or more taints and assesses whether at least one of the one or more cumulative taints is indicative of potential security risk to one or more resources for the one or more potential taint indicators and the associated one or more sources comprises:

associating at least one of a plurality of taints indicative of potential security risk with two or more registers individually assigned in corresponding two or more taint vectors.

39. The computing system according to claim 3 wherein the assigning at least one of the one or more potential taint indicators to at least one taint vector including vector fields operated upon by the one or more instructions comprises:

assigning at least one of the one or more potential taint indicators to at least one taint vector including vector fields operated upon by the one or more instructions, the vector fields including at least one resource field associated with at least one resource affected by the execution of the instructions, the at least one resource field indicating an assignment of memory including at least one of: (1) assigning a taint vector per memory byte, (2) assigning a taint vector per entire memory, (3) assigning a taint vector by memory page, or (4) assigning a taint vector by memory type.

40. The computing system according to claim 3 wherein the assigning at least one of the one or more potential taint indicators to at least one taint vector including vector fields operated upon by the one or more instructions comprises:

assigning at least one of the one or more potential taint indicators to at least one taint vector including vector fields operated upon by the one or more instructions, the vector fields including at least one memory taint hash table indicating a level of tainting per memory block.

41. The computing system according to claim 3 wherein the assigning at least one of the one or more potential taint indicators to at least one taint vector including vector fields operated upon by the one or more instructions comprises:

assigning at least one of the one or more potential taint indicators to at least one taint vector including vector fields operated upon by the one or more instructions, the vector fields including at least one taint hash vector wherein a memory portion receives a specified hash of an address and the specified hash is configured to compress the address.

42. The computing system according to claim 3 wherein the assigning at least one of the one or more potential taint indicators to at least one taint vector including vector fields operated upon by the one or more instructions comprises:

assigning at least one of the one or more potential taint indicators to at least one taint vector including vector fields operated upon by the one or more instructions, the vector fields including at least one resource field associated with at least one resource affected by the execution of the instructions, wherein assignment of the at least one resource field is based at least in part on a predictive hint instruction configured to operate in conjunction with an operating system to hint a prediction of usage for the one or more resources.

\* \* \* \* \*

UNITED STATES PATENT AND TRADEMARK OFFICE
CERTIFICATE OF CORRECTION

PATENT NO.        : 9,443,085 B2
APPLICATION NO.   : 13/199368
DATED             : September 13, 2016
INVENTOR(S)       : Glew et al.

Page 1 of 1

It is certified that error appears in the above-identified patent and that said Letters Patent is hereby corrected as shown below:

In Column 39, Line 41, Claim 12 "the at least one taint vector including two or more vector" should be --the at least one taint vector including vector--

Signed and Sealed this
Fourteenth Day of March, 2017

Michelle K. Lee
*Director of the United States Patent and Trademark Office*